US012603688B2

(12) United States Patent
Ly et al.

(10) Patent No.: US 12,603,688 B2
(45) Date of Patent: Apr. 14, 2026

(54) SPATIAL FILTER CORRESPONDENCE AND RANDOM ACCESS PROCEDURES FOR RECONFIGURABLE INTELLIGENT SURFACES

(71) Applicant: QUALCOMM Incorporated, San Diego, CA (US)

(72) Inventors: Hung Dinh Ly, San Diego, CA (US); Yu Zhang, San Diego, CA (US); Krishna Kiran Mukkavilli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 369 days.

(21) Appl. No.: 18/025,816

(22) PCT Filed: Nov. 6, 2020

(86) PCT No.: PCT/CN2020/126997
§ 371 (c)(1),
(2) Date: Mar. 10, 2023

(87) PCT Pub. No.: WO2022/094905
PCT Pub. Date: May 12, 2022

(65) Prior Publication Data
US 2023/0362847 A1      Nov. 9, 2023

(51) Int. Cl.
*H04B 7/06*        (2006.01)
*H04W 56/00*       (2009.01)
*H04W 74/0833*     (2024.01)

(52) U.S. Cl.
CPC ...... *H04B 7/06952* (2023.05); *H04W 56/001* (2013.01); *H04W 74/0833* (2013.01)

(58) Field of Classification Search
None
See application file for complete search history.

(56) References Cited

U.S. PATENT DOCUMENTS 11,695,466 B2 * 7/2023 Nam ................. H04B 7/15507
                                                      375/262
2023/0030819 A1    2/2023 Yagyu
(Continued)

FOREIGN PATENT DOCUMENTS

CN      109511156 A      3/2019
CN      111050277 A      4/2020
(Continued)

OTHER PUBLICATIONS

Di Renzo M., et al., "Smart Radio Environments Empowered by Reconfigurable Intelligent Surfaces: How It Works, State of Research, and The Road Ahead", IEEE Journal on Selected Areas in Communications, IEEE Service Center, Piscataway, US, vol. 38, No. 11, Jul. 14, 2020, pp. 2450-2525, XP011815060, Sections A and B, p. 2461-p. 2463.

(Continued)

*Primary Examiner* — Kevin T Bates
(74) *Attorney, Agent, or Firm* — ArentFox Schiff LLP

(57)                ABSTRACT

Example implementations include a method, apparatus and computer-readable medium of wireless communication to be performed by a user equipment (UE), comprising receiving, from a base station, a synchronization signal block (SSB) via a reconfigurable intelligent surface (RIS), the SSB corresponding to a first SSB type configured for RIS-assisted procedures. The implementations further include performing, with the base station according to the SSB, a random access channel (RACH) procedure. Additionally, the implementations further include transmitting, to the base station according to the SSB, an indication that the SSB corresponds to the first SSB type as part of the RACH procedure.

28 Claims, 12 Drawing Sheets

(56) References Cited

U.S. PATENT DOCUMENTS

| | | | | |
|---|---|---|---|---|
| 2023/0107283 A1 * | 4/2023 | Park | .................... | H01Q 15/148 |
| | | | | 370/329 |
| 2023/0337158 A1 * | 10/2023 | Zhang | ................ | H04L 27/2613 |
| 2024/0388327 A1 * | 11/2024 | Kim | .................. | H04B 7/06952 |

FOREIGN PATENT DOCUMENTS

| | | | | | |
|---|---|---|---|---|---|
| CN | 111246496 A | 6/2020 | | | |
| CN | 111416646 A | 7/2020 | | | |
| CN | 111698046 A | 9/2020 | | | |
| EP | 3641461 A1 | 4/2020 | | | |
| KR | 20150086116 A | 7/2015 | | | |
| WO | 2020154666 | 7/2020 | | | |
| WO | 2020168334 A1 | 8/2020 | | | |
| WO | WO-2021221183 A1 * | 11/2021 | ............. | H04B 7/022 |
| WO | WO-2021221603 A1 * | 11/2021 | ........... | G01S 5/0036 |

OTHER PUBLICATIONS

Supplementary European Search Report—EP20960366—Search Authority—The Hague—Jun. 26, 2024.

Nadeem, Qurrat-Ul-Aln et al. "Asymptotic Max-Min SINR Analysis of Reconfigurable Intelligent Surface Assisted MISO Systems" IEEE Transactions on Wireless Communications, Apr. 14, 2020 (Apr. 14, 2020), the whole document.

International Search Report and Written Opinion issued in corresponding International Application No. PCT/CN2020/126997 dated Aug. 4, 2021.

* cited by examiner

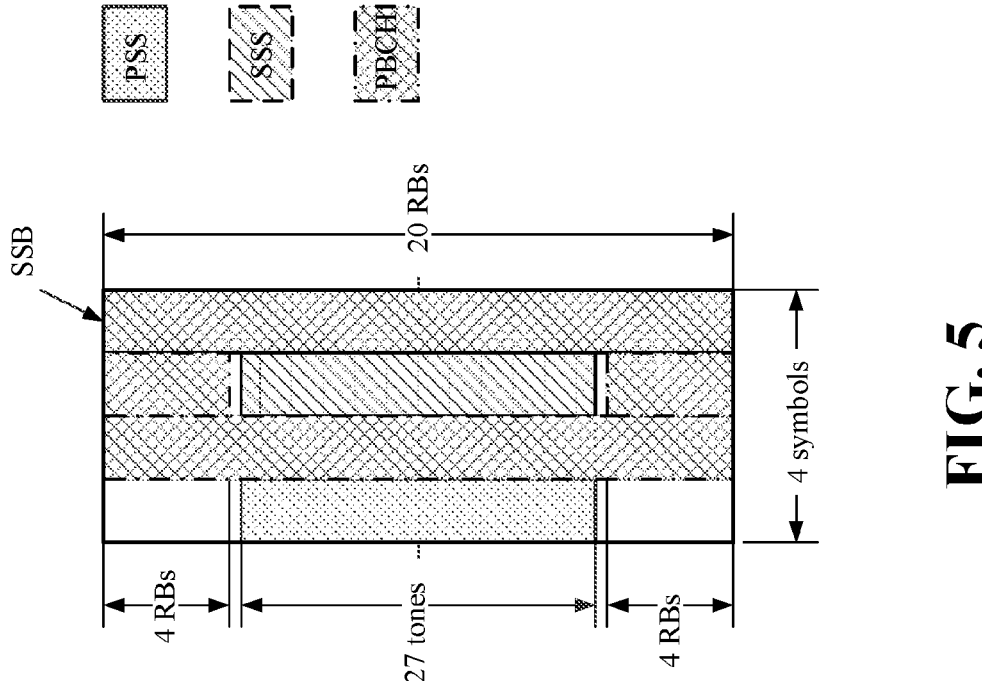
FIG. 5

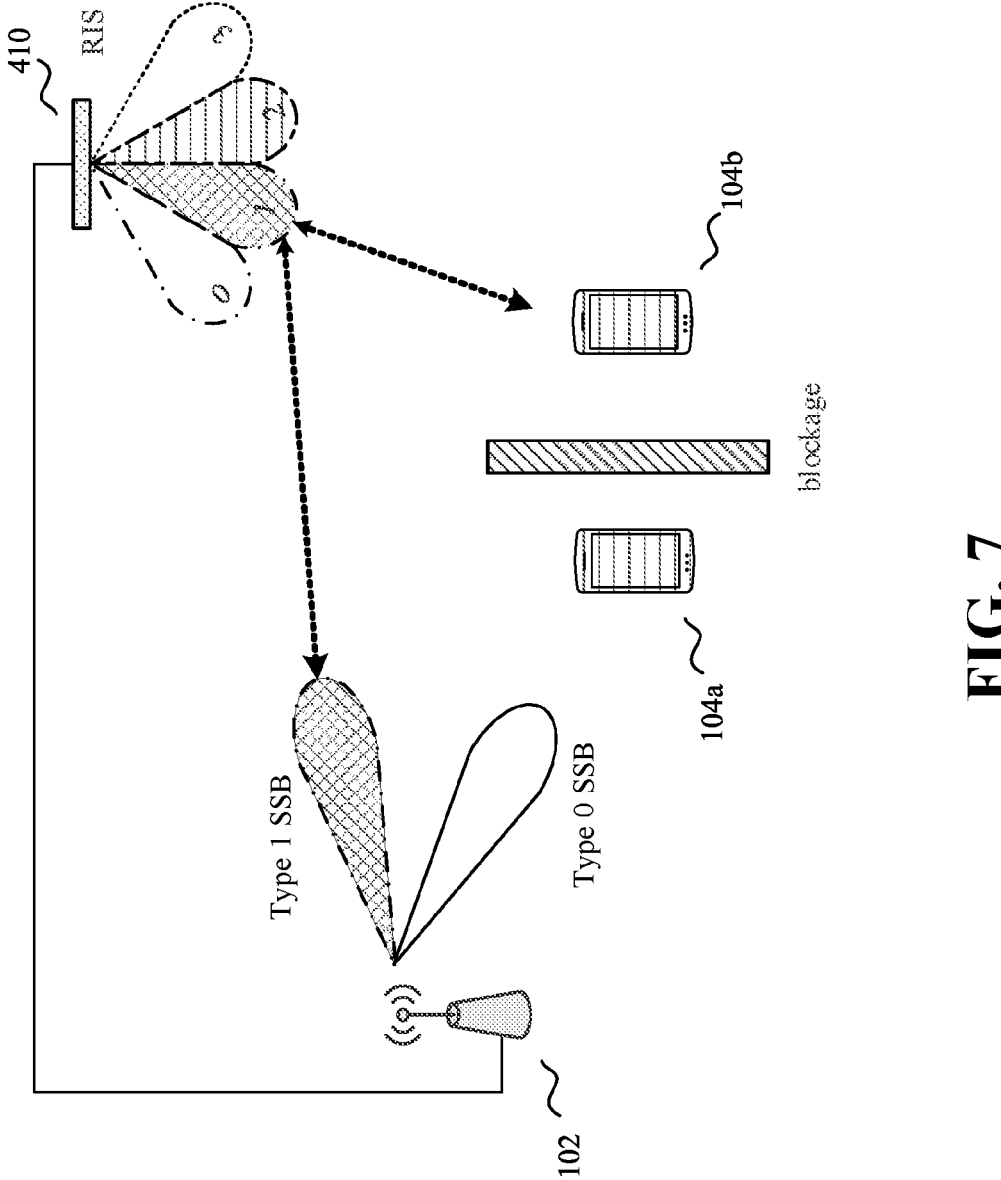
FIG. 7

1000

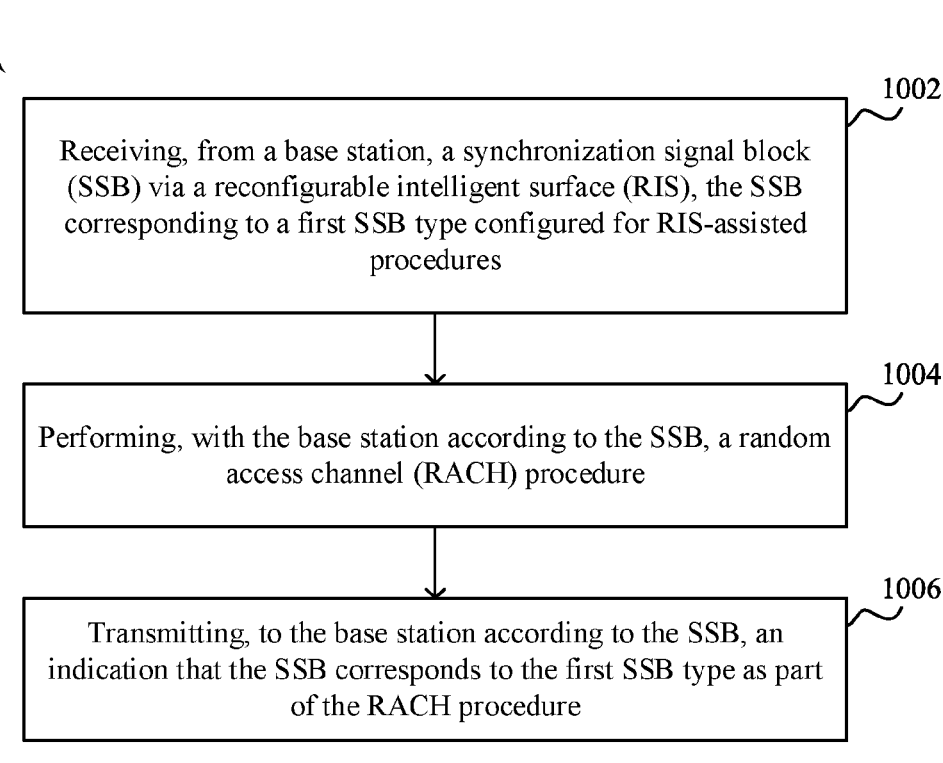

1002

Receiving, from a base station, a synchronization signal block (SSB) via a reconfigurable intelligent surface (RIS), the SSB corresponding to a first SSB type configured for RIS-assisted procedures

1004

Performing, with the base station according to the SSB, a random access channel (RACH) procedure

1006

Transmitting, to the base station according to the SSB, an indication that the SSB corresponds to the first SSB type as part of the RACH procedure

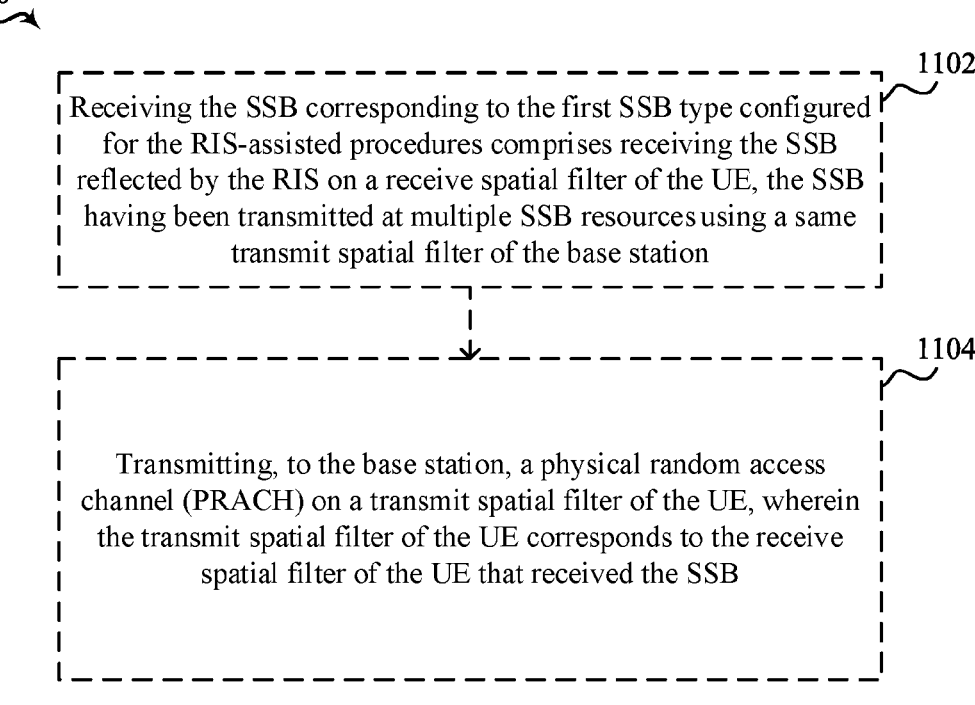

1102

Receiving the SSB corresponding to the first SSB type configured for the RIS-assisted procedures comprises receiving the SSB reflected by the RIS on a receive spatial filter of the UE, the SSB having been transmitted at multiple SSB resources using a same transmit spatial filter of the base station

1104

Transmitting, to the base station, a physical random access channel (PRACH) on a transmit spatial filter of the UE, wherein the transmit spatial filter of the UE corresponds to the receive spatial filter of the UE that received the SSB

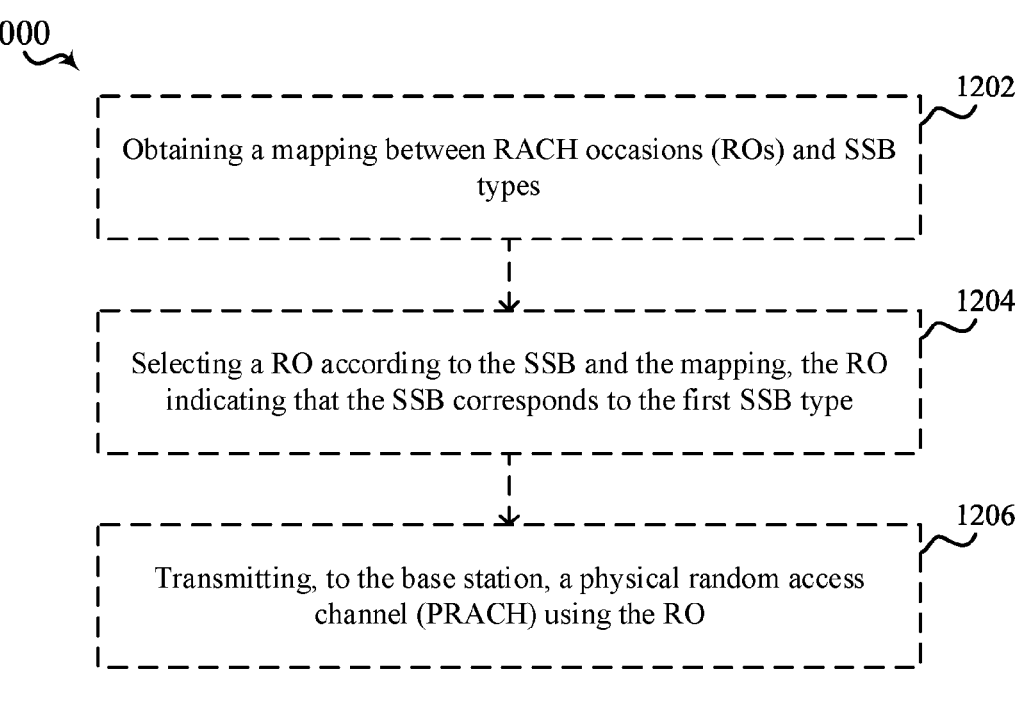

```
                                                                    1202
┌─ ─ ─ ─ ─ ─ ─ ─ ─ ─ ─ ─ ─ ─ ─ ─ ─ ─ ─ ─ ─ ─ ─ ─ ─┐
│                                                   │
│   Obtaining a mapping between RACH occasions (ROs) and SSB  │
│                        types                      │
│                                                   │
└─ ─ ─ ─ ─ ─ ─ ─ ─ ─ ─ ─ ┬ ─ ─ ─ ─ ─ ─ ─ ─ ─ ─ ─ ─ ─┘
                          │
                          ↓                           1204
┌─ ─ ─ ─ ─ ─ ─ ─ ─ ─ ─ ─ ─ ─ ─ ─ ─ ─ ─ ─ ─ ─ ─ ─ ─┐
│                                                   │
│   Selecting a RO according to the SSB and the mapping, the RO  │
│    indicating that the SSB corresponds to the first SSB type   │
│                                                   │
└─ ─ ─ ─ ─ ─ ─ ─ ─ ─ ─ ─ ┬ ─ ─ ─ ─ ─ ─ ─ ─ ─ ─ ─ ─ ─┘
                          │
                          ↓                           1206
┌─ ─ ─ ─ ─ ─ ─ ─ ─ ─ ─ ─ ─ ─ ─ ─ ─ ─ ─ ─ ─ ─ ─ ─ ─┐
│                                                   │
│    Transmitting, to the base station, a physical random access  │
│              channel (PRACH) using the RO         │
│                                                   │
└─ ─ ─ ─ ─ ─ ─ ─ ─ ─ ─ ─ ─ ─ ─ ─ ─ ─ ─ ─ ─ ─ ─ ─ ─┘
```

```
                                                                    1302
┌─ ─ ─ ─ ─ ─ ─ ─ ─ ─ ─ ─ ─ ─ ─ ─ ─ ─ ─ ─ ─ ─ ─ ─ ─┐
│                                                   │
│   Obtaining a set of physical random access channel (PRACH)  │
│                      preambles                    │
│                                                   │
└─ ─ ─ ─ ─ ─ ─ ─ ─ ─ ─ ─ ┬ ─ ─ ─ ─ ─ ─ ─ ─ ─ ─ ─ ─ ─┘
                          │
                          ↓                           1304
┌─ ─ ─ ─ ─ ─ ─ ─ ─ ─ ─ ─ ─ ─ ─ ─ ─ ─ ─ ─ ─ ─ ─ ─ ─┐
│ Selecting a PRACH preamble from the set of PRACH preambles, │
│    the selected PRACH preamble indicating that the SSB     │
│             corresponds to the first SSB type     │
└─ ─ ─ ─ ─ ─ ─ ─ ─ ─ ─ ─ ┬ ─ ─ ─ ─ ─ ─ ─ ─ ─ ─ ─ ─ ─┘
                          │
                          ↓                           1306
┌─ ─ ─ ─ ─ ─ ─ ─ ─ ─ ─ ─ ─ ─ ─ ─ ─ ─ ─ ─ ─ ─ ─ ─ ─┐
│                                                   │
│    Transmitting, to the base station, a PRACH comprising the   │
│                selected PRACH preamble            │
│                                                   │
└─ ─ ─ ─ ─ ─ ─ ─ ─ ─ ─ ─ ─ ─ ─ ─ ─ ─ ─ ─ ─ ─ ─ ─ ─┘
```

SPATIAL FILTER CORRESPONDENCE AND RANDOM ACCESS PROCEDURES FOR RECONFIGURABLE INTELLIGENT SURFACES

CROSS-REFERENCE TO RELATED APPLICATIONS

This application is a 35 U.S.C. § 371 National Phase Application of PCT Application No. PCT/CN2020/126997 filed Nov. 6, 2020, entitled "SPATIAL FILTER CORRESPONDENCE AND RANDOM ACCESS PROCEDURES FOR RECONFIGURABLE INTELLIGENT SURFACES," which is assigned to the assignee hereof and hereby incorporated by reference herein.

BACKGROUND

Technical Field

The present disclosure relates generally to communication systems, and more particularly, to spatial filter correspondence and random access channel (RACH) procedures using reconfigurable intelligent surfaces.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. Wireless communication may involve the transmission and propagation of signals using reconfigurable intelligent surfaces (RIS). Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication to be performed by a user equipment (UE), comprising receiving, from a base station, a synchronization signal block (SSB or a synchronization signal (SS)/physical broadcast channel (PBCH) block) via a reconfigurable intelligent surface (RIS), the SSB corresponding to a first SSB type configured for RIS-assisted procedures. The method further includes performing, with the base station according to the SSB, a random access channel (RACH) procedure. Additionally, the method further includes transmitting, to the base station according to the SSB, an indication that the SSB corresponds to the first SSB type as part of the RACH procedure.

Another example implementation includes an apparatus for wireless communication to be performed by a user equipment (UE), comprising a memory and a processor in communication with the memory. The processor is configured to receive, from a base station, a synchronization signal block (SSB or a synchronization signal (SS)/physical broadcast channel (PBCH) block) via a reconfigurable intelligent surface (RIS), the SSB corresponding to a first SSB type configured for RIS-assisted procedures. The processor is further configured to perform, with the base station according to the SSB, a random access channel (RACH) procedure. Additionally, the processor is further configured to transmit, to the base station according to the SSB, an indication that the SSB corresponds to the first SSB type as part of the RACH procedure.

Another example implementation includes an apparatus for wireless communication to be performed by a user equipment (UE), comprising means for receiving, from a base station, a synchronization signal block (SSB or a synchronization signal (SS)/physical broadcast channel (PBCH) block) via a reconfigurable intelligent surface (RIS), the SSB corresponding to a first SSB type configured for RIS-assisted procedures. The apparatus further includes means for performing, with the base station according to the SSB, a random access channel (RACH) procedure. Additionally, the apparatus further includes means for transmitting, to the base station according to the SSB, an indication that the SSB corresponds to the first SSB type as part of the RACH procedure.

Another example implementation includes a computer-readable medium (e.g., a non-transitory computer-readable medium) comprising stored instructions for wireless communication to be performed by a user equipment (UE), executable by a processor to receive, from a base station, a synchronization signal block (SSB or a synchronization signal (SS)/physical broadcast channel (PBCH) block) via a reconfigurable intelligent surface (RIS), the SSB corresponding to a first SSB type configured for RIS-assisted procedures. The instructions are further executable to perform, with the base station according to the SSB, a random access channel (RACH) procedure. Additionally, the instructions are further executable to transmit, to the base station according to the SSB, an indication that the SSB corresponds to the first SSB type as part of the RACH procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating an example synchronization signal block (SSB), in accordance with various aspects of the present disclosure.

FIG. 7 is a diagram illustrating an example of a wireless communications system, in accordance with various aspects of the present disclosure.

FIG. 10 is a flowchart of a method of wireless communication to be performed by a UE in accordance with various aspects of the present disclosure.

FIG. 11 is a flowchart of first additional or optional steps for a method of wireless communication to be performed by a UE in accordance with various aspects of the present disclosure.

FIG. 12 is a flowchart of second additional or optional steps for a method of wireless communication to be performed by a UE in accordance with various aspects of the present disclosure.

FIG. 13 is a flowchart of third additional or optional steps for a method of wireless communication to be performed by a UE in accordance with various aspects of the present disclosure.

DETAILED DESCRIPTION

Figure 1:
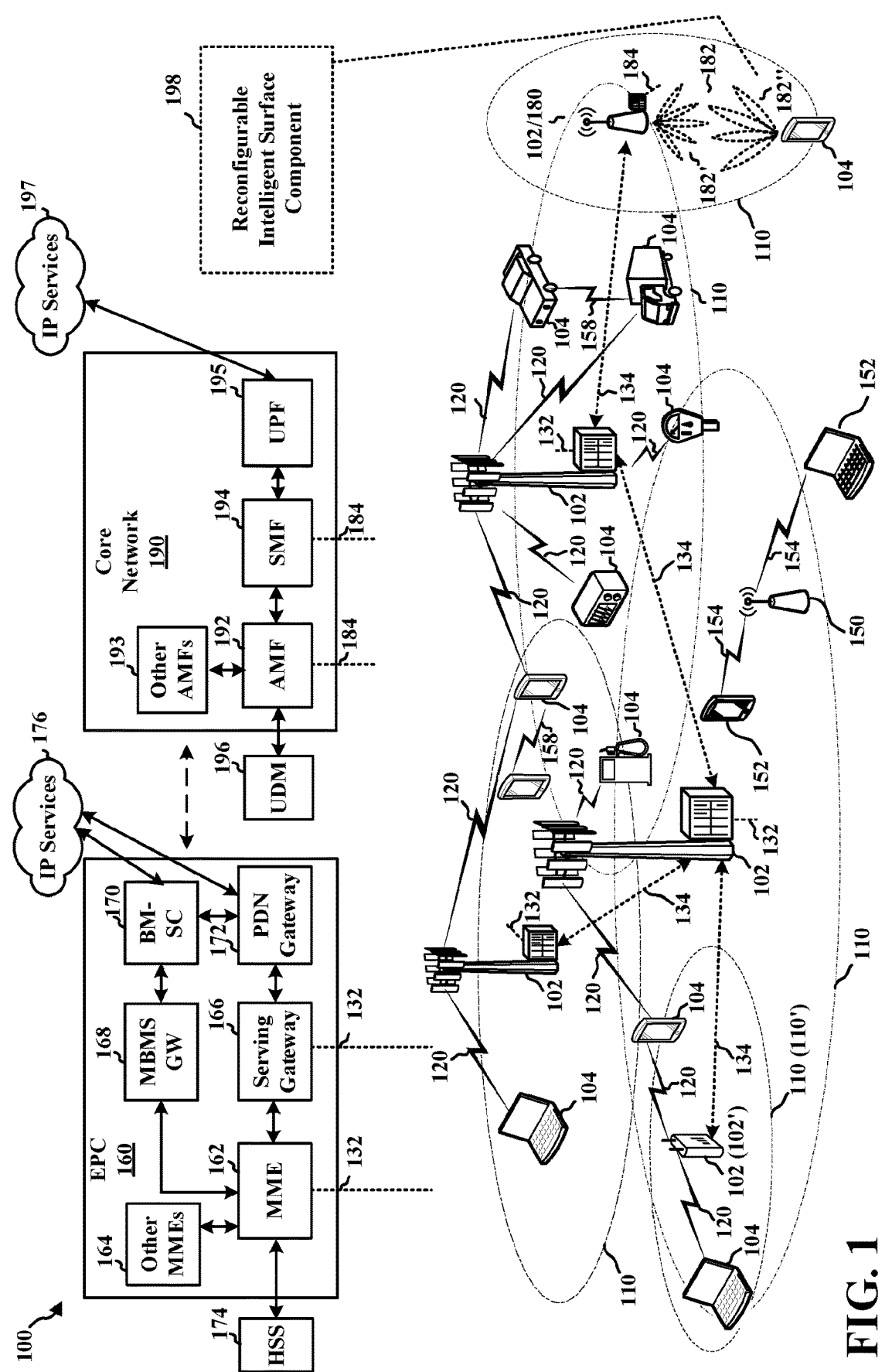
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A user equipment (UE) in a wireless communications system may perform conventional channel training procedures to acquire a channel between a network device and the UE. The conventional channel training procedures may establish a channel between the network device and the UE that may not include additional system components or devices in the transmission path (e.g., relay devices, other network devices). Additionally or alternatively, the UE may perform reconfigurable intelligent surface (RIS)-assisted channel training procedures to establish a RIS-assisted channel between the network device and the UE via a MS. The network device may utilize a RIS to create a propagation path between the network device and the UE to establish the MS-assisted channel. The network device may transmit different types of synchronization signal blocks (SSBs or a synchronization signal (SS)/physical broadcast channel (PBCH) blocks) according to the type of channel training procedure that needs to be performed (e.g., conventional or MS-assisted). The terms SSB and SS/PBCH may be used interchangeably. However, conventional systems do not provide for the UE to indicate to the network device the type of SSB received by the UE. In such conventional systems, the network device may be unable to determine whether to establish a conventional channel or a RIS-assisted channel with the UE.

Aspects presented herein provide for multiple manners for a UE to indicate to the network device whether to establish a conventional channel or a RIS-assisted channel. Such an indication may allow the network device to determine which channel training procedures to employ. Further, aspects presented herein may reduce complexity and power consumption of the wireless communication system.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may include a RIS component 198 configured to receive a SSB via a RIS, perform a RACH procedure according to the SSB, and transmit an indication of the SSB type as part of the RACH procedure.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user IP packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communications system and the access network 100 described above in FIG. 1. The resources may be time-based, frequency-based, or both on time and frequency.

Figures 2A, 2B, 2C, 2D:
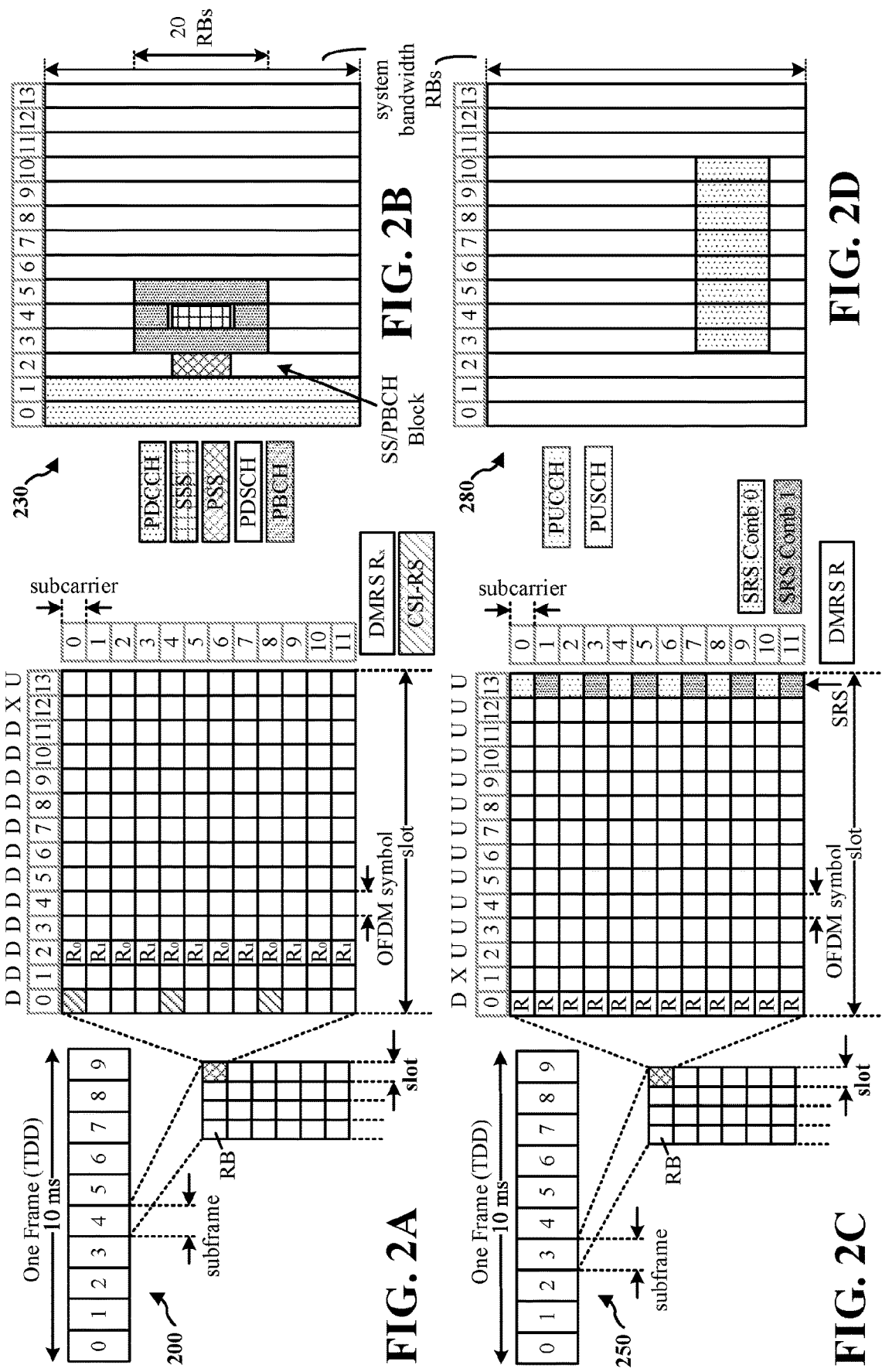
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
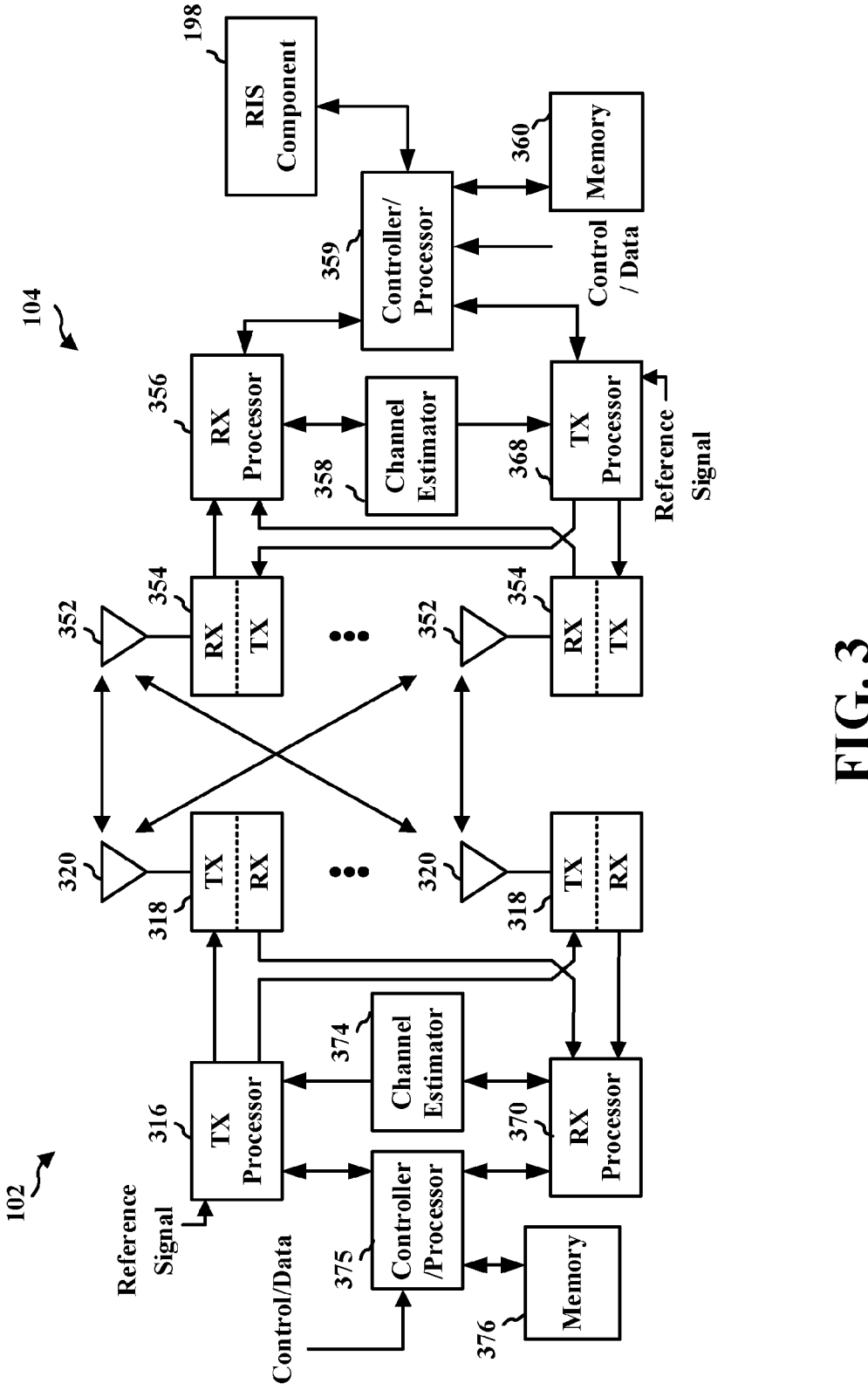
FIG. 3 is a diagram illustrating an example of hardware components of the base station and the user equipment (UE) in the access network, in accordance with various aspects of the present disclosure.

FIG. 3 is a block diagram of example hardware components of a base station 102 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318 TX. Each transmitter 318 TX may modulate an RF carrier with a respective spatial stream for transmission.

At the UE 104, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At the UE 104, at least one of the TX processor 368, the RX processor 356, and the controller/processor 359 may be configured to perform aspects in connection with the reconfigurable intelligent surfaces component 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
FIG. 4 is a diagram illustrating an example of a wireless communications system, in accordance with various aspects of the present disclosure.

FIG. 4 is a diagram illustrating an example of a wireless communications system 400. The wireless communications system 400 may comprise base stations 102 and UEs 104. The architecture of the system depicted in FIG. 4 is similar in many respects to the architecture of the wireless communications system 100 described above with reference to FIG. 1 and may include additional features not mentioned above. Some of the elements of the wireless communications system 100 described above have been omitted for the sake of simplicity.

The base stations 102 may use multiple-input and multiple-output (MIMO) antenna technology, including spatial multiplexing, spatial filtering, and/or transmit diversity. The base stations 102 may comprise a plurality of antenna elements configured to perform the spatial multiplexing, the spatial filtering, and/or the transmit diversity. For example, the base stations 102 may comprise 64 or more antenna elements in one frequency band and/or 1,024 or more antenna elements in another frequency band. Additionally or alternatively, the base stations 102 may attempt to increase throughput by employing spatial filtering techniques and active antenna units (AAU) to increase gain of the antenna elements. For example, the active antenna units (not shown) may be used to focus transmitted energy from the base station 102*a* into a spatially-filtered signal 182*a* directed towards the UE 104*a*. However, the AAU may require that an individual radio frequency (RF) chain be implemented for each antenna port. In such an implementation, the use of AAU may result in a significant increase in power consumption as each of these RF chains needs to actively transmit and receive signals.

Additionally, the use of AAU and spatial filtering techniques may not be sufficient to provide service to all of the UEs 104 in a coverage area of the base station 102. For example, a blockage may exist that may prevent the base station 102*a* from communicating with a UE 104*b*. The blockage may be an artificial structure (e.g., a high-rise building, a bridge, etc.) or may be a natural feature of the terrain (e.g., a mountain, a change in elevation, etc.). Typically, in conventional systems an operator may install a second base station 102*b* (e.g., macrocell, microcell, femtocell, etc.) to provide service coverage to a region experiencing the blockage (i.e., coverage hole). That is, the second base station 102*b* may communicate with and provide services to the UE 104*b*. However, such an approach may add complexity to the wireless communication system 400 and increase costs due to the duplication of active communication equipment. Furthermore, power consumption requirements of the wireless communication system 400 may increase as well.

According to certain aspects of the present disclosure, the wireless communication system 400 may further comprise a RIS 410. The RIS 410 may comprise a passive surface that may be dynamically configured to manipulate incident electromagnetic waves to change channel conditions. That is, the RIS 410 may be a passive device that may be configured to influence transmitted waves without injecting additional power to the transmitted waves. The base station 102*a* may use the RIS 410 to create a propagation path that avoids the blockage in order to establish a communication channel between the base station 102*a* and the UE 104*b*. The base station 102*a* may create the propagation path by dynamically controlling one or more of scattering, reflection, and refraction characteristics of the RIS 410 to redirect the spatially-filtered signals 182*a* between the base station 102*a* and the UE 104*b*. That is, the base station 102*a* may use the RIS 410 to communicate with the UE 104*b* without the need for the second base station (i.e., 102*b*). Thus, aspects presented herein may reduce complexity and/or power consumption of the wireless communication system 400.

Referring to FIG. 5, the diagram illustrates an example SSB 500 that may be used for communications between network elements (e.g., base station 102, UE 104) of the wireless communications system 100 described above in FIG. 1. The base station 102 may transmit one or more SSBs using multiple spatial-filtered signals in a time-division multiplexing (TDM) scheme. Additionally or alternatively, base station 102 may transmit the one or more SSBs using the multiple spatial-filtered signals in a frequency-division multiplexing (FDM) scheme. For example, the one or more SSBs may be transmitted according to a synchronization raster. The synchronization raster may indicate time and frequency resources reserved for the transmission of SSBs that may be used by the UE 104 for synchronizing with the base station 102. The UE 104 may scan a frequency band according to the synchronization raster when performing a cell search. In some aspects, the UE 104 may receive one or more SSBs from base station 102. Additionally or alternatively, the UE 104 may receive one or more SSBs from multiple base stations 102. The UE 104 may acquire downlink synchronization information and/or system information based on the received one or more SSBs. In some aspects, the UE 104 may be located within a certain downlink spatial filter of base station 102, and, as a result, may receive one SSB from base station 102. That is, the UE 104 may be unaware of the transmission of other SSBs within the cell.

A synchronization signal (such as a primary synchronization signal (PSS) or a secondary synchronization signal (SSS)) and physical broadcast channel (PBCH) may be packed as a single block and placed together as an SSB 500. The UE 104 may use the PSS to determine subframe/symbol timing of the base station 102 and to determine a physical layer identity. The SSS may be used by a UE 104 to determine a physical layer cell identity group number and radio frame timing. The PBCH may include Physical Broadcast Channel Demodulation Reference Signals (PBCH DMRS) and PBCH Data Signals. Furthermore, the PBCH may carry a master information block (MIB). The MIB may provide a number of resource blocks (RBs) in the system bandwidth and a system frame number (SFN).

An SSB 500 may have different patterns or structures depending on parameters such as subcarrier spacing (SCS) for both SSB symbols and data symbols, a frequency range, and the like. For example, an SSB 500 may occupy 4 OFDM symbols in the time domain and 240 tones/subcarriers (20 resource blocks) in the frequency domain. Within the SSB 500, the PSS may occupy 127 tones/subcarriers (12 resource blocks) of the first OFDM symbol of the SSB. The SSS may occupy 127 tones/subcarriers (12 resource blocks) of the third OFDM symbol of the SSB. The PBCH may fully occupy (20 resource blocks) of the second and fourth OFDM symbols and occupy a total of 96 tones/subcarriers (8 resource blocks) above and below the SSS.

Figure 6:
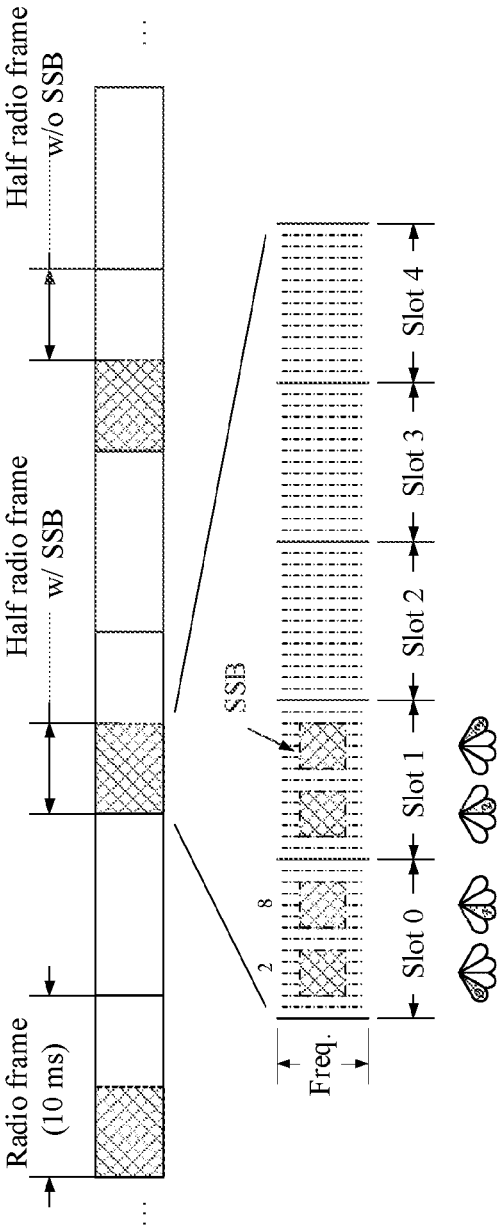
FIG. 6 is a diagram illustrating an example of SSB transmissions, in accordance with various aspects of the present disclosure.

Referring to FIG. 6, diagram 600 illustrates example resources for transmission of an SSB 500. A base station 102 may periodically transmit the SSB 500 to allow the UEs 104 an opportunity to synchronize with a wireless communications system 100 or a wireless communications system 400. In some aspects, the base station 102 may transmit multiple instances of the SSBs 500 in a synchronization burst. In the synchronization burst, the multiple SSB transmissions may be sent within a single time window (e.g., 5 msec). The multiple SSB transmissions may allow for coverage enhancements and/or directional beams to UEs in different locations. For example, each SSB in the multiple SSB transmissions may be transmitted in a corresponding predefined direction. The predefined directions may be configured to result in providing service coverage with each synchronization burst to at least a portion of the spatial coverage area of the base station 102. The base station 102, however, may be limited by predefined rules in the number of SSBs and the corresponding directions of the SSBs that may be transmitted within a particular time frame. The limitations may be based on various factors, including the particular subcarrier spacing used by the system and the frequency band in which the system operates. For example, one frequency band may have a maximum of 4 or 8 SSB transmissions within a synchronization burst and another frequency band may have a maximum of 64 SSB transmissions.

As shown in FIG. 6, a frame (e.g., 10 msec) may be divided into two equally sized half radio frames (e.g., 5 msec). Each half radio frame may include one or more time slots, as described above with reference to FIG. 2A. The base station 102 may transmit synchronization bursts during one of the two half radio frames of each frame according to the synchronization raster. For example, the base station 102 may transmit a first SSB starting at OFDM symbol 2 of slot 0 of the half radio frame, a second SSB starting at OFDM symbol 8 of slot 0 of the half radio frame, a third SSB starting at OFDM symbol 2 of slot 1 of the half radio frame, and a fourth SSB starting at OFDM symbol 8 of slot 1 of the half radio frame.

Additionally or alternatively, the base station 102 may transmit each SSB using a corresponding spatial filter resulting in covering a spatial area with each synchronization burst. For example, the base station 102 may transmit the first SSB using spatial filter 0 to direct the resulting signal in a first direction, the second SSB using spatial filter 1 to direct the resulting signal in a second direction, the third SSB using spatial filter 2 to direct the resulting signal in a third direction, and the fourth SSB using spatial filter 3 to direct the resulting signal in a fourth direction.

It may be understood that the exemplary SSB transmission configuration illustrated in FIG. 6 is only one example of SSB transmission configurations that may be utilized without departing from the scope described herein. For example, other configurations may incorporate different quantities of spatial filters or different quantities of SSB transmissions.

FIG. 7 is a diagram illustrating an example of a wireless communications system 700. The wireless communications system 700 may comprise a base station 102 and UEs 104. The architecture of the system depicted in FIG. 7 is similar in many respects to the architecture of the wireless communications systems 100 and 400 described above with reference to FIGS. 1 and 4 and may include additional features not mentioned above. Some of the elements of the wireless communications systems 100 and 400 described above have been omitted for the sake of simplicity.

In some aspects, the base station 102 may periodically transmit synchronization bursts comprising type 0 SSBs ("legacy" SSBs) for conventional (or "legacy") channel training procedures. That is, conventional channel training procedures may not include a RIS 410 to establish a communication channel between the base station 102 and the UE 104a, for example. In some aspects, the base station 102 may transmit each type 0 SSB of the synchronization burst using a corresponding spatial filter. Each spatial filter may be configured to transmit the corresponding type 0 SSB in a distinct direction of the spatial coverage area of the base station 102. In such a configuration, the synchronization burst of type 0 SSBs may result in providing service coverage to at least a portion of the spatial coverage area of the base station 102.

In some aspects, the base station 102 may periodically transmit synchronization bursts comprising type 1 SSBs for RIS-assisted channel training procedures. The RIS-assisted procedures may comprise channel training procedures to establish a communication channel between the base station 102 and the UE 104b using the RIS 410 to create the propagation path between the two end devices (i.e., base station 102 and UE 104b). The type 1 SSB may include a PSS, a SSS and a PBCH which may be distinguishable from the legacy SSB (type 0 SSB) by transmitting the type 1 SSB over a separate synchronization frequency or by an indication in the SSS or by indication in the PBCH.

In some aspects, the base station 102 may transmit each type 1 SSB of the synchronization burst using a corresponding spatial filter. Each spatial filter may be configured to transmit the corresponding type 1 SSB in a distinct direction of the spatial coverage area of the base station 102. In such a configuration, the synchronization burst of type 1 SSBs may result in providing service coverage to at least a portion of the spatial coverage area of the base station 102.

Additionally or alternatively, the base station 102 may transmit the type 1 SSBs of the synchronization burst using a particular spatial filter. The particular spatial filter may be directed towards the RIS 410. Furthermore, the base station 102 may control propagation characteristics of the RIS 410 to ensure that the type 1 SSBs are reflected from the RIS 410 in distinct directions of a spatial coverage area of the RIS 410. For example, the base station 102 may transmit a first type 1 SSB in a particular direction towards the RIS 410 and ensure that the first type 1 SSB is reflected from the RIS 410 in a first direction. The base station 102 may further transmit a second type 1 SSB in the particular direction towards the RIS 410 and ensure that the second type 1 SSB is reflected from the RIS 410 in a second direction. The base station 102 may further transmit a third type 1 SSB in the particular direction towards the RIS 410 and ensure that the third type 1 SSB is reflected from the RIS 410 in a third direction. The base station 102 may further transmit a fourth type 1 SSB in the particular direction towards the RIS 410 and ensure that the fourth type 1 SSB is reflected from the MS 410 in a fourth direction. In some aspects, the reflection directions may be configured to provide service coverage to at least a portion of the spatial coverage area of the base station 102 reachable by the RIS 410. In some implementations, the described techniques may be used by the base station 102 to provide service coverage to a region experiencing a blockage without the need of a second base station 102.

In certain aspects, one or more of the type 1 SSBs propagating from the RIS 410 may be received by the UE 104*b*. For example, the UE 104*b* may be located in a coverage hole of the base station 102 that is covered by the RIS 410.

Aspects presented herein provide for allowing UEs that are unaware of reconfigurable intelligent surfaces (e.g., "legacy" UEs) to remain deployed in an enterprise, extending their useful lifetime, while allowing newer RIS-aware UEs to be introduced as deemed appropriate. While legacy UEs may not be aware of the presence of RISs, in some aspects legacy UEs may receive transmission signals from a base station using a RIS as a reflector. That is, the RIS may behave as a random object or reflector in the transmission environment and may reflect signals from a base station towards the legacy UE. However, neither the legacy UE nor the base station may be aware of the presence of the RIS. In such scenarios, legacy UEs may receive broadcast or unicast signals transmitted by a base station. For example, a legacy UE may receive a type 0 SSB from base station 102. Furthermore, type 1 SSBs may be configured such that a legacy UE is unable to receive type 1 SSB transmissions. Thus, legacy UEs may perform conventional channel training procedures but may not perform RIS-assisted channel training procedures.

With further reference to FIG. 7, the UE 104*a* may receive a type 0 SSB from the base station 102. The UE 104*a* may receive the type 0 SSB without the presence of the RIS 410. Based on receiving the type 0 SSB, the UE 104*a* may determine that RIS-assisted procedures may not be needed, and may proceed to perform conventional channel training procedures. In some aspects, the UE 104*a* may also receive a type 1 SSB (not shown). However, the UE 104*a* may prioritize the received type 0 SSB over the received type 1 SSB. That is, if or when the UE 104*a* receives a type 0 SSB and a type 1 SSB, the UE 104*a* may select the type 0 SSB over the type 1 SSB and perform conventional channel training procedures according to the type 0 SSB.

Additionally or alternatively, the UE 104*a* may receive the type 0 SSB after having been reflected by a RIS (not shown). For example, the UE 104*a* may receive the type 0 SSB that may have not been intended to be reflected by the RIS 410. Based on receiving the type 0 SSB, the UE 104*a* may proceed to perform conventional channel training procedures according to the type 0 SSB.

The UE 104*b* may receive a type 1 SSB from base station 102 after the type 1 SSB transmission has been reflected by the RIS 410. Based on receiving the type 1 SSB, the UE 104*b* may determine that RIS-assisted procedures may be needed, and may proceed to perform RIS-assisted channel training procedures. In some aspects, the UE 104*b* may also receive a type 0 SSB (not shown). However, the UE 104*b* may prioritize the received type 0 SSB over the received type 1 SSB. That is, if or when the UE 104*b* receives a type 0 SSB and a type 1 SSB, the UE 104*b* may select the type 0 SSB over the type 1 SSB and perform conventional channel training procedures according to the type 0 SSB.

Some aspects presented herein enable the UE 104*b* to indicate to the base station 102 that RIS-assisted channel training procedures may be needed based on a determination that the type 1 SSB was received. Thus, aspects presented herein may allow base station 102 to determine that UE 104*b* received the type 1 SSB and that the RIS-assisted channel training procedures may be needed.

Figure 8:
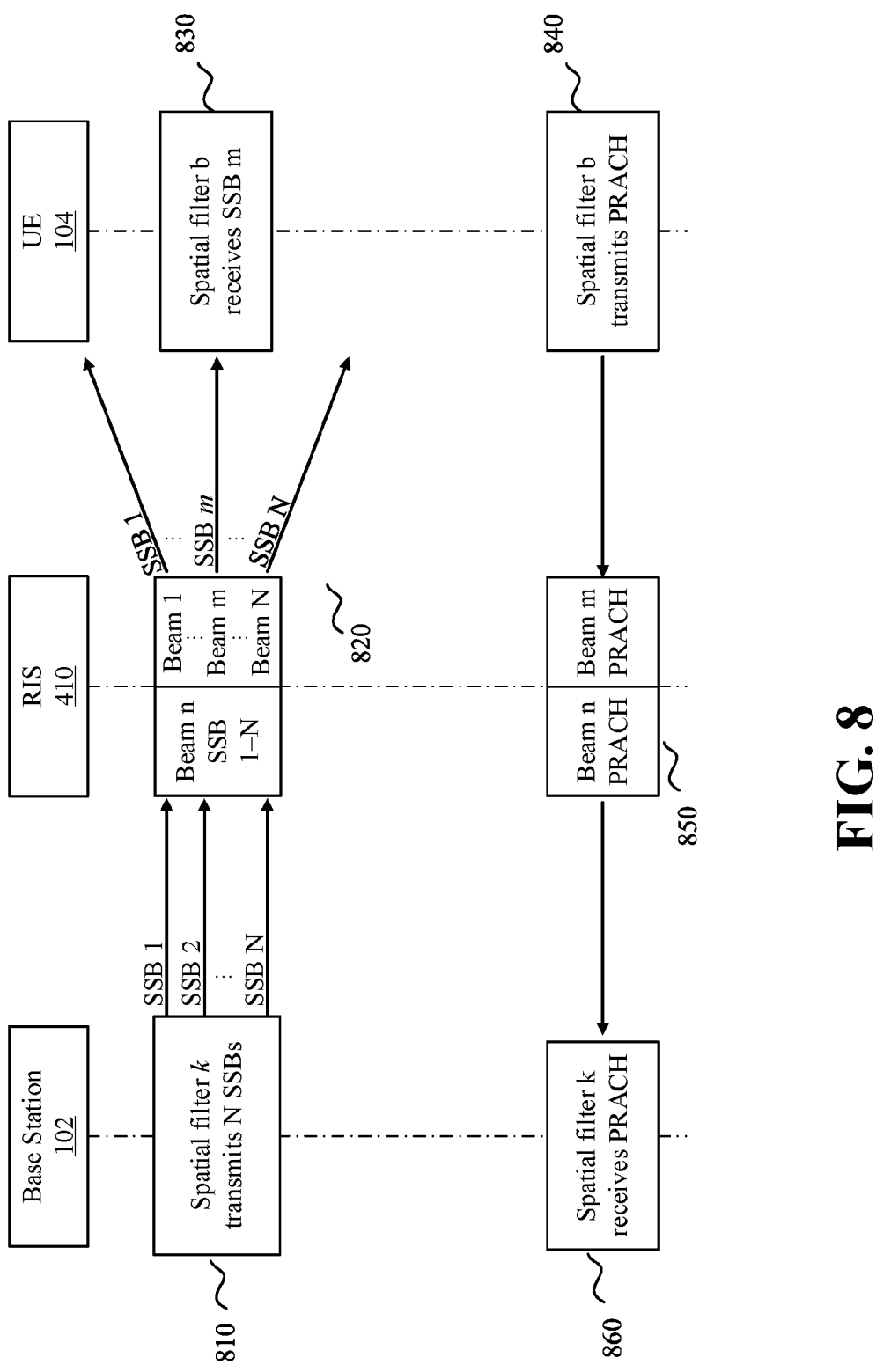
FIG. 8 is a diagram illustrating an example signal transmission and reception path between a base station and a UE using a reconfigurable intelligent surface (RIS), in accordance with various aspects of the present disclosure.

FIG. 8 is a diagram 800 illustrating an example signal transmission and reception path between a base station 102 and a UE 104 using a RIS 410. The signal transmission and reception path 800 is associated with transmission of type 1 SSBs by the base station 102 using the RIS 410 to initiate RIS-assisted channel training procedures with the UE 104. In some aspects, spatial filter correspondence may be maintained between the base station 102 and the MS 410, and between the MS 410 and the UE 104.

The base station 102, at 810, may transmit a synchronization burst comprising N type 1 SSBs using a particular transmit spatial filter (e.g., beam k) of the base station 102, where N is an integer greater than 0 (e.g., 1, 2, . . . , N). The N SSB transmissions of the synchronization burst may be sent within a single time window (e.g., 5 msec). The transmit spatial filter k of the base station 102 may be targeted towards the MS 410. In particular, the transmit spatial filter k of the base station 102 may be targeted towards beam n of the RIS 410. The N SSB transmissions may arrive at the MS 410 in a direction corresponding to the beam n of the MS 410.

At 820, the base station 102 may dynamically configure the RIS 410 to ensure that the N SSBs are reflected from the MS 410 in respective directions that correspond to beams 1-N of the RIS 410. For example, SSB 1 may reflect from the RIS 410 in a direction corresponding to beam 1 of the RIS 410, SSB m may reflect from the RIS 410 in a direction corresponding to beam m of the RIS 410, and SSB N may reflect from RIS 410 in a direction corresponding to beam N of the RIS 410.

The UE 104, at 830, may receive SSB m using receive spatial filter b of the UE 104. The UE 104 may determine that SSB m corresponds to the type 1 SSB and may further determine that RIS-assisted channel training procedures are needed. The UE 104 may determine that the SSB m corresponds to the type 1 SSB according to an indication of the SSB m indicating that the SSB m corresponds to the type 1 SSB. The SSB m may explicitly and/or implicitly indicate that the SSB m corresponds to the type 1 SSB. For example, the SSB m may comprise data or control information indicating that the SSB m corresponds to the type 1 SSB. Additionally or alternatively, a transport format of the SSB m may implicitly indicate that the SSB m corresponds to the type 1 SSB. The transport format of the SSB may comprise one or more configuration parameters associated with transmission of the SSB other than the content of the SSB. For example, the transport format of the SSB may comprise one or more of a modulation scheme, a coding scheme, a time resource, or a frequency resource used to transmit the SSB. In some aspects, the UE 104 may determine whether SSB m comprises data information or control information indicating that the SSB m corresponds to the type 1 SSB. Additionally or alternatively, the UE 104 may further determine one or more of the modulation scheme, the coding scheme, the time resource, or the frequency resource used to transmit the SSB m to determine whether the SSB m corresponds to the type 1 SSB.

The UE 104 may, based at least in part on the determination that the SSB m corresponds to the type 1 SSB, further determine that RIS-assisted channel training procedures are needed.

Based at least on the determination that SSB m corresponds to the type 1 SSB and that RIS-assisted channel training procedures are needed, the UE 104, at 840, may transmit a physical random access channel (PRACH) on a spatial filter corresponding to the spatial filter on which the SSB was received. For example, the UE 104 may transmit the PRACH using spatial filter b of the UE 104. It should be understood that transmitting the PRACH comprises transmitting data and/or control information using resources defined by the PRACH, and that receiving the PRACH comprises receiving data and/or control information using resources defined by the PRACH.

The PRACH from the UE 104 may arrive at the RIS 410, at 850, in a direction corresponding to the beam m of the RIS 410. That is, the PRACH may arrive at the RIS 410 in the same direction as the SSB m reflected from the RIS 410. The RIS 410 may be configured to ensure that the PRACH arriving at the beam m of the RIS 410 is reflected from the RIS 410 in the direction corresponding to the beam n of the RIS 410.

At 860, the base station 102 may receive the PRACH from the RIS 410 using a receive spatial filter k of the base station 102. The base station 102 may determine that the PRACH was received on a spatial filter k corresponding to the spatial filter k used to transmit the type 1 SSB. Based at least on the determination of the spatial filter correspondence, the base station 102 may further determine that RIS-assisted channel training procedures are needed with UE 104. That is, spatial filter correspondence between a spatial filter used to transmit a type 1 SSB and a spatial filter used to receive a PRACH may serve as an indication that the corresponding UE received the type 1 SSB and may further indicate that RIS-assisted channel training procedures are needed with the corresponding UE. In some aspects, the PRACH may further indicate a suitable spatial filter for reflecting the type 1 SSB at the RIS 410.

Additionally or alternatively, the UE 104 may select a random access channel (RACH) occasion (RO) that indicates that the SSB m corresponds to the type 1 SSB and that the RIS-assisted channel training procedures are needed. The UE 104 may use the resources corresponding to the selected RO to transmit the PRACH to the base station 102 via the RIS 410. In some aspects, the base station 102 may determine that the UE 104 received the type 1 SSB and that the RIS-assisted channel training procedures are needed with the UE 104 based at least in part on the RO on which the PRACH was received by the base station 102.

In some aspects, the UE 104 may obtain a mapping between ROs and SSB types. For example, the UE 104 may receive the mapping from the base station 102. The mapping may indicate one or more ROs that correspond to type 1 SSBs. The UE 104 may utilize the mapping between ROs and SSB types to select a RO that indicates that the UE 104 received a type 1 SSB. Additionally or alternatively, the mapping between ROs and SSB types may further include spatial filtering configurations suitable for transmissions or reflections at the RIS 410. Thus, the UE 104 may indicate, to the base station 102, the SSB type received by the UE 104 based on the selected RO used to transmit the PRACH to the base station 102.

In additional or optional aspects, the UE 104 may obtain a first mapping between ROs and type 1 SSBs. For example, the mapping may indicate one or more ROs that correspond to type 1 SSBs. Additionally or alternatively, the UE 104 may obtain a second mapping between ROs and type 0 SSBs. The UE 104 may utilize the first mapping to select a RO for transmitting a PRACH to the base station 102, via the RIS 410, if or when the UE 104 has determined that the SSB corresponds to a type 1 SSB. The UE 104 may utilize the second mapping to select a RO for transmitting the PRACH to the base station 102, via the RIS 410, if or when the UE 104 has determined that the SSB corresponds to a type 0 SSB. Thus, the UE 104 may indicate, to the base station 102, the SSB type received by the UE 104 based on the selected RO used to transmit the PRACH to the base station 102.

In additional or optional aspects, the UE 104 may obtain a mapping between ROs and SSBs. For example, the mapping may indicate one or more ROs that correspond to type 0 SSBs or to type 1 SSBs. The UE 104 may utilize the mapping to select, based on the type of SSB of the received SSB, a RO for transmitting a PRACH to the base station 102, via the RIS 410. Thus, the UE 104 may indicate, to the base station 102, the SSB type received by the UE 104 based on the selected RO used to transmit the PRACH to the base station 102.

In other additional or optional aspects, the UE 104 may obtain a set of PRACH preambles corresponding to type 0 SSBs and type 1 SSBs. For example, a portion of the set of PRACH preambles may correspond to type 0 SSBs, and the remaining portion of the set of PRACH preambles may correspond to type 1 SSBs. The UE 104 may select a PRACH preamble according to the SSB that indicates the type of SSB received by the UE 104. The PRACH transmitted to the base station 102 by the UE 104 may comprise the selected PRACH preamble. Thus, the UE 104 may indicate, to the base station 102, the SSB type received by the UE 104 based on the PRACH preamble comprised by the PRACH transmitted to the base station 102.

In other optional or additional aspects, the UE 104 may transmit, to the base station 102 via the MS 410, a physical uplink shared channel (PUSCH). The PUSCH may indicate to the base station 102 that the SSB received by the UE 104 corresponds to a type 1 SSB and that RIS-assisted channel training procedures are needed. For example, a demodulation reference signal of the PUSCH may indicate that the received SSB corresponds to the type 1 SSB. Additionally or alternatively, a scrambling code of the PUSCH may indicate that the received SSB corresponds to the type 1 SSB. In other optional or additional aspects, a payload of the PUSCH may comprise an indication that the received SSB corresponds to the type 1 SSB. Additionally or alternatively, the UE 104 may select a PUSCH occasion that indicates that the received SSB corresponds to the type 1 SSB. Each PUSCH occasion may consist of multiple demodulation reference signal (DMRS) ports and DMRS sequences. The UE 104 may transmit the PUSCH to the base station 102, via the RIS 410, using the resources corresponding to the selected PUSCH occasion. Thus, aspects presented herein may allow base station 102 to determine that UE 104 received a type 1 SSB and that RIS-assisted channel training procedures may be needed.

Figure 9:
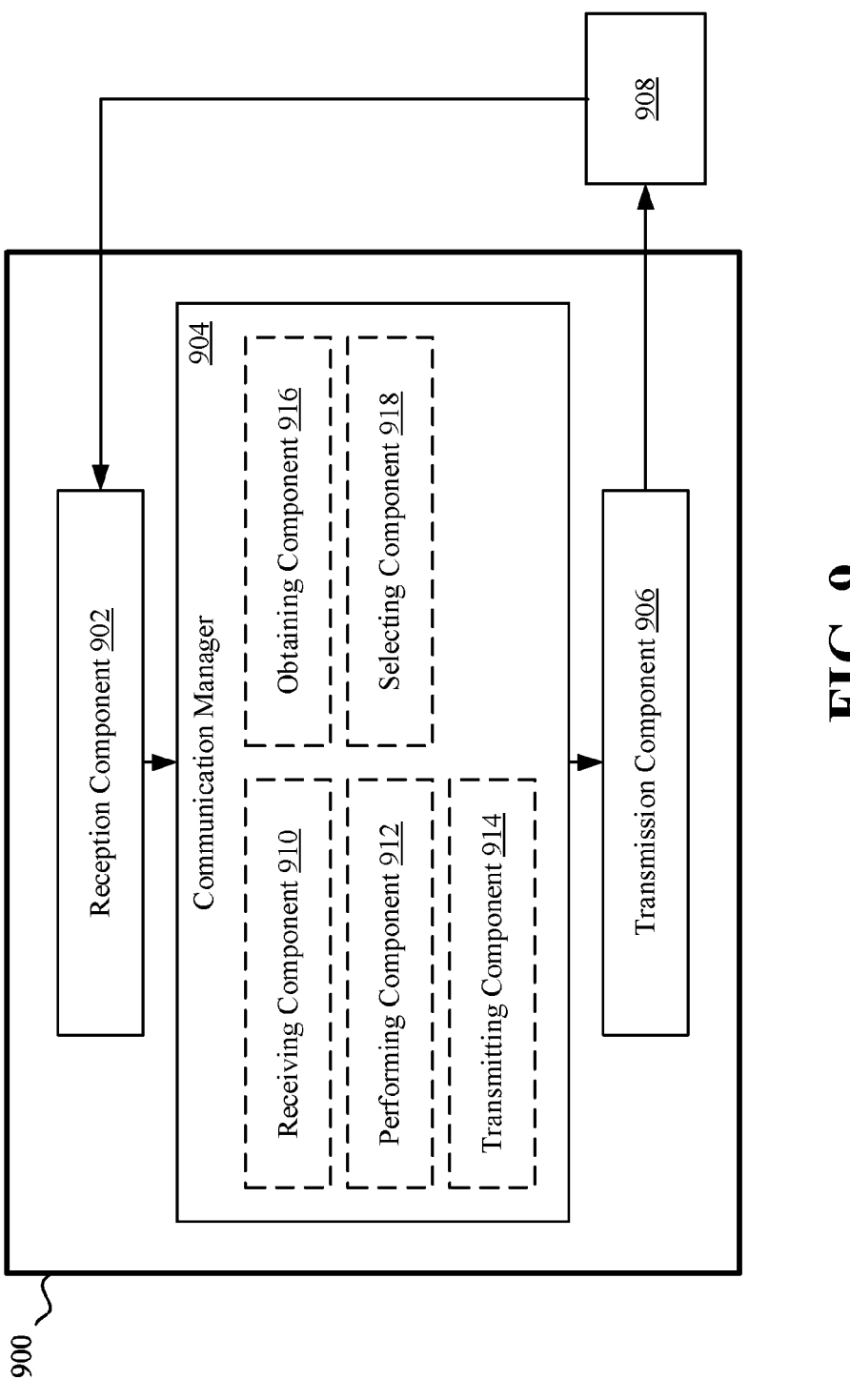
FIG. 9 is a diagram illustrating an example apparatus in accordance with various aspects of the present disclosure.

FIG. 9 is a block diagram of an example apparatus 900 for wireless communication. The apparatus 900 may be a UE or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a base station, or another wireless communication device) using the reception component 902 and the transmission component 906.

In some aspects, the apparatus 900 may be configured to perform one or more operations described herein in connection with FIGS. 4-8. Additionally or alternatively, the apparatus 900 may be configured to perform one or more processes described herein, such as method 1000 of FIGS. 10-18. In some aspects, the apparatus 900 may include one or more components of the UE described above in connection with FIGS. 1 and 3.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIGS. 1 and 3.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIGS. 1 and 3. In some aspects, the transmission component 906 may be collocated with the reception component 902 in a transceiver or transceiver component.

The communication manager 904 may receive SSBs and incoming RACH procedure signaling and messaging from the reception component 902 and may provide indications that the SSBs correspond to the type 1 SSB and outgoing RACH procedure signaling and messaging transmission component 906. For example, the communication manager 904 may receive, from a base station, an SSB via a RIS, the SSB corresponding to a first SSB type configured for RIS-assisted procedures; perform, with the base station according to the SSB, a RACH procedure; and transmit, to the base station according to the SSB, an indication that the SSB corresponds to the first SSB type as part of the RACH procedure. In some aspects, the communication manager 904 may include a controller/processor, a memory, or a combination thereof, of the UE described above in connection with FIGS. 1 and 3.

In some aspects, the communication manager 904 may include a set of components, such as a receiving component 910, a performing component 912, a transmitting component 914, an obtaining component 916, a selecting component 918, or a combination thereof. Alternatively, the set of components may be separate and distinct from the communication manager 904. In some aspects, one or more components of the set of components may include or may be implemented within a controller/processor, a memory, or a combination thereof, of the UE described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The receiving component 910 may receive a SSB from a base station via a RIS. For example, the receiving component 910 may receive the SSB reflected by the RIS on a receive spatial filter of the apparatus 900. The SSB corresponding to a first SSB type configured for RIS-assisted procedures and having been transmitted by the base station at multiple SSB resources using a same transmit spatial filter of the base station.

The performing component 912 may perform, with the base station and according to the SSB, a RIS-assisted channel training procedure. For example, the RIS assisted channel training procedure may comprise a RACH procedure. In some aspects, the performing component 912 may, as part of a RACH procedure, transmit, to the base station, a PRACH on a transmit spatial filter of the apparatus 900. Additionally or alternatively, the performing component 912 may transmit the PRACH using a selected RO. Additionally or alternatively, the PRACH transmitted by the performing component 912 may comprise a selected PRACH preamble. In some aspects, transmitting the PRACH on the transmit spatial filter may ensure that the base station receives the PRACH on a receive spatial filter of the base station and may further ensure that the base station indicates a suitable spatial filter for reflecting the SSB at the RIS.

The transmitting component 914 may transmit, to the base station and as part of the RIS-assisted channel training procedure, an indication that the SSB corresponds to the first SSB type. For example, the transmitting component 914 may transmit, to the base station, a PUSCH carrying the indication that the SSB corresponds to the first SSB type.

The obtaining component 916 may obtain mappings of SSB types. For example, the obtaining component 916 may obtain a mapping between RACH occasions and SSB types. Additionally or alternatively, the obtaining component 916 may obtain a set of PRACH preambles corresponding to the first SSB type. In some aspects, the obtaining component 916 may obtain a first mapping between RACH occasions and SSB types corresponding to the first SSB type and may further obtain a second mapping of SSB between RACH occasions and SSB types corresponding to a second SSB type. Additionally or alternatively, the mapping may further indicate spatial filtering configurations suitable for transmission or reflections at the RIS. In some aspects, the obtaining component 916 may obtain the mappings from the base station or from another network device.

The selecting component 918 may select a transport format parameter indicating that the SSB corresponds to the first SSB type. For example, the selecting component 918 may select a RO according to the SSB and the mapping between RACH occasions and SSB types. The selected RACH occasion may indicate that the SSB corresponds to the first SSB type. Additionally or alternatively, the selecting component 918 may select a PRACH preamble according to the SSB and the set of PRACH preambles corresponding to the first SSB type. The selected PRACH preamble may indicate that the SSB corresponds to the first SSB type. In some aspects, the selecting component 918 may select a PUSCH occasion indicating that the SSB corresponds to the first SSB type.

Referring to FIGS. 10-18, in operation, a UE 104 may perform a method 1000 of wireless communication. The method 1000 may be performed by the UE 104 (which may include the memory 360 and which may be the entire UE 104 or a component of the UE 104 such as the RIS component 198, the TX processor 368, the RX processor 356, or the controller/processor 359). The method 1000 may be performed by the UE RIS component 198 in communication with the base station 102.

In block 1002 of FIG. 10, the method 1000 may include receiving, from a base station, a SSB via a RIS, the SSB corresponding to a first SSB type configured for RIS-assisted procedures. For example, in an aspect, the UE 104, the MS component 198, and/or the receiving component 910 may be configured to or may comprise means for receiving, from the base station 102, a SSB via a RIS 410, the SSB corresponding to a first SSB type configured for RIS-assisted procedures.

For example, the receiving in block 1002 may include receiving an SSB using a particular receive spatial filter of the UE 104. In some aspects, the receiving in block 1002 may further include determining, by the UE 104, that the SSB corresponds to a type 1 SSB and further determining that RIS-assisted channel training procedures are needed.

Further, for example, the receiving in block 1002 may be performed in response to detecting a type 1 SSB while scanning a frequency band according to a synchronization raster when performing a cell search. The synchronization raster may indicate time and frequency resources reserved for the transmission of SSBs that may be used by the UE 104 for synchronization with the base station 102.

In block 1004, the method 1000 may include performing, with the base station according to the SSB, a RACH procedure. For example, in an aspect, the UE 104, the RIS component 198, and/or the performing component 912 may be configured to or may comprise means for performing, with the base station 102 according to the SSB, the RACH procedure.

For example, the performing in block 1004 may include performing RIS-assisted channel training procedures in response to the determination that the SSB corresponds to a type 1 SSB and the further determination that the RIS-assisted channel training procedures are needed.

Further, for example, the performing in block 1004 may be performed to establish a communication channel between the base station 102 and the UE 104 via the RIS 410. The location of the UE 104 may place the UE in a coverage hole within the coverage area of the base station 102. For example, a blockage may exist that may prevent the base station 102 from communicating with the UE 104. The blockage may be an artificial structure (e.g., a high-rise building, a bridge, etc.) or may be a natural feature of the terrain (e.g., a mountain, a change in elevation, etc.). Typically, in conventional systems an operator may install a second base station 102 (e.g., macrocell, microcell, femtocell, etc.) to provide service coverage to the region experiencing the blockage (i.e., coverage hole). However, the communication channel established via the RIS 410 may permit the UE 104 to access services provided by base station 102 that may have typically not been accessible due to a location of the UE 104. That is, the base station 102 may use the RIS 410 to communicate with the UE 104 without the need for a second base station. Thus, aspects presented herein may reduce complexity and power consumption of a wireless communication system.

In block 1006, the method 1000 may include transmitting, to the base station according to the SSB, an indication that the SSB corresponds to the first SSB type as part of the RACH procedure. For example, in an aspect, the UE 104, the RIS component 198, and/or the transmitting component 914 may be configured to or may comprise means for transmitting, to the base station 102 according to the SSB, an indication that the SSB corresponds to the first SSB type as part of the RACH procedure.

For example, the transmitting in block 1006 may include transmitting, to the base station 102 via the RIS 410 and during the RACH procedure, information indicating that the UE 104 received a SSB corresponding to a type 1 SSB and further indicating that RIS-assisted channel training procedures are needed.

In some optional or additional aspects, the transmitting in block 1006 may include transmitting, to the base station 102 via the RIS 410, a PUSCH indicating that the UE 104 received a type 1 SSB and that RIS-assisted channel training procedures are needed. For example, the PUSCH may comprise a demodulation reference signal that indicates that the received SSB corresponds to the type 1 SSB. Additionally or alternatively, a scrambling code of the PUSCH may indicate that the received SSB corresponds to the type 1 SSB. In other optional or additional aspects, a payload of the PUSCH may comprise an indication that the received SSB corresponds to the type 1 SSB.

Further, for example, the transmitting in block 1006 may be performed to enable the UE 104 to indicate to the base station 102 that RIS-assisted channel training procedures may be needed based on a determination that a type 1 SSB was received. Thus, aspects presented herein may allow the base station 102 to determine that the UE 104 received the type 1 SSB and that RIS-assisted channel training procedures may be needed.

Referring to FIG. 11, in an optional or additional aspect, in block 1102, the receiving in block 1002 may further include receiving the SSB reflected by the RIS on a receive spatial filter of the UE, the SSB having been transmitted at multiple SSB resources using a same transmit spatial filter of the base station. For example, in an aspect, UE 104, RIS component 198, and/or receiving component 910 may be configured to or may comprise means for receiving the SSB reflected by the RIS on a receive spatial filter of the UE, the SSB having been transmitted at multiple SSB resources using a same transmit spatial filter of the base station.

For example, the receiving in block 1102 may include receiving the SSB using a particular receive spatial filter of the UE 104. The SSB received in block 1102 may have been transmitted by the base station 102 as part of a synchronization burst transmission comprising N type 1 SSBs using a same transmit spatial filter of the base station 102, where N is an integer greater than 0 (e.g., 1, 2, . . . , N). The N SSB transmissions of the synchronization burst may have been sent within a single time window (e.g., 5 msec). The transmit spatial filter of the base station 102 may have been targeted towards the RIS 410. In particular, the transmit spatial filter of the base station 102 may be targeted towards a particular beam of the RIS 410. The N SSB transmissions may have arrived at the RIS 410 in a direction corresponding to the particular beam of the RIS 410. Additionally or alternatively, the base station 102 may have dynamically configured the RIS 410 to ensure that the N SSBs are reflected from the RIS 410 in respective directions that correspond to beams 1-N of the RIS 410. For example, SSB 1 may have reflected from RIS 410 in a direction corresponding to beam 1 of the RIS 410, SSB m may have reflected from RIS 410 in a direction corresponding to beam m of the RIS 410, and SSB N may have reflected from RIS 410 in a direction corresponding to beam N of the RIS 410.

Further, for example, the receiving in block 1102 may be performed to initiate RIS-assisted channel training procedures.

In this optional or additional aspect, in block 1104, the method 1000 may further include transmitting, to the base station 102, a PRACH on a transmit spatial filter of the UE, wherein the transmit spatial filter of the UE corresponds to the receive spatial filter of the UE that received the SSB. Transmitting the PRACH on the transmit spatial filter of the UE ensures that the base station 102 receives the PRACH on a receive spatial filter of the base station and indicates a suitable spatial filter for reflecting the SSB at the RIS 410. For example, in an aspect, the UE 104, the RIS component 198, and/or the transmitting component 914 may be configured to or may comprise means for transmitting, to the base station 102, a PRACH on a transmit spatial filter of the UE 104, wherein the transmit spatial filter of the UE corresponds to the receive spatial filter of the UE that received the SSB. Transmitting the PRACH on the transmit spatial filter of the UE 104 ensures that the base station 102 receives the PRACH on a receive spatial filter of the base station 102 and indicates a suitable spatial filter for reflecting the SSB at the RIS 410.

For example, the transmitting in block 1104 may include transmitting the PRACH on a spatial filter corresponding to the spatial filter on which the SSB was received. The PRACH from the UE 104 may arrive at the RIS 410 in a same direction as the SSB reflected from the RIS 410. The RIS 410 may be configured to ensure that the PRACH arriving from the UE 104 is reflected from the MS 410 in a same direction as the SSB arrived at the RIS 410. The base station 102 may receive the PRACH from the RIS 410 using a same spatial filter as the spatial filter used to transmit the SSB to the UE 410. It should be understood that transmitting the PRACH comprises transmitting data and/or control information using resources defined by the PRACH, and that receiving the PRACH comprises receiving data and/or control information using resources defined by the PRACH.

Further, for example, the transmitting in block 1104 may be performed to initiate the RIS-assisted channel training procedures and to indicate to the base station that the SSB corresponds to the type 1 SSB as part of the RACH procedure. That is, spatial filter correspondence between a spatial filter used to transmit a type 1 SSB and a spatial filter used to receive a PRACH may serve as an indication that the corresponding UE received the type 1 SSB and may further indicate that RIS-assisted channel training procedures are needed with the corresponding UE. In some aspects, the PRACH may further indicate a suitable spatial filter for reflecting the type 1 SSB at the RIS 410.

Referring to FIG. 12, in another optional or additional aspect, in block 1202, the method 1000 may further include obtaining a mapping between RACH occasions (ROs) and SSB types. For example, in an aspect, the UE 104, the RIS component 198, and/or the obtaining component 916 may be configured to or may comprise means for obtaining a mapping between the ROs and the SSB types.

For example, the obtaining in block 1202 may include obtaining the mapping between the ROs and the SSB types. For example, the mapping may indicate one or more ROs that correspond to type 1 SSBs. Additionally or alternatively, the mapping may further indicate one or more ROs that correspond to type 0 SSBs.

Further, for example, the obtaining in block 1202 may be performed to obtain RACH occasions that correspond to the type 1 SSB and that the UE 104 may use to indicate to the base station 102 that the UE 104 received a type 1 SSB and that RIS-assisted channel training procedures are needed.

In this optional or additional aspect, in block 1204, the method 1000 may further include selecting a RO according to the SSB and the mapping, the RO indicating that the SSB corresponds to the first SSB type. For example, in an aspect, the UE 104, the RIS component 198, and/or the selecting component 918 may be configured to or may comprise means for selecting a RO according to the SSB and the mapping, the RO indicating that the SSB corresponds to the first SSB type.

For example, the selecting in block 1204 may include selecting, from the mapping between ROs and SSB types, a RO that corresponds to the type 1 SSB.

Further, for example, the selecting in block 1204 may be performed to select a RO that the UE 104 may use to indicate to the base station 102 that the UE 104 received a type 1 SSB and that RIS-assisted channel training procedures are needed.

In this optional or additional aspect, in block 1206, the transmitting in block 1006 may further include transmitting, to the base station 102, a PRACH using the RO. For example, in an aspect, the UE 104, the RIS component 198, and/or the transmitting component 914 may be configured to or may comprise means for transmitting, to the base station, a PRACH using the RO.

For example, the transmitting in block 1206 may include transmitting, to the base station 102 via the RIS 410, a PRACH using the selected RO. In some aspects, the base station 102 may determine that the UE 104 received a type 1 SSB and that RIS-assisted channel training procedures are needed with the UE 104 based on the RO on which the PRACH was received by the base station 102.

Further, for example, the transmitting in block 1206 may be performed to indicate to the base station 102 that the UE 104 received a type 1 SSB and that RIS-assisted channel training procedures are needed.

Referring to FIG. 13, in another optional or additional aspect, in block 1302, the method 1000 may further include obtaining a set of PRACH preambles. For example, in an aspect, the UE 104, the RIS component 198, and/or the obtaining component 916 may be configured to or may comprise means for obtaining a set of PRACH preambles.

For example, the obtaining in block 1302 may include obtaining a set of PRACH preambles corresponding to type 0 SSBs and type 1 SSBs. For example, a portion of the set of PRACH preambles may correspond to type 0 SSBs, and the remaining portion of the set of PRACH preambles may correspond to type 1 SSBs.

Further, for example, the obtaining in block 1302 may be performed to indicate, to the base station 102, the SSB type received by the UE 104 based on the PRACH preamble comprised by the PRACH transmitted to the base station 102.

In this optional or additional aspect, in block 1304, the method 1000 may further include selecting a PRACH preamble from the set of PRACH preambles, the selected PRACH preamble indicating that the SSB corresponds to the first SSB type. For example, in an aspect, the UE 104, the RIS component 198, and/or the selecting component 918 may be configured to or may comprise means for selecting a PRACH preamble from the set of PRACH preambles, the selected PRACH preamble indicating that the SSB corresponds to the first SSB type.

For example, the selecting in block 1304 may include selecting a PRACH preamble according to the SSB that indicates the type of SSB received by the UE 104.

Further, for example, the selecting in block 1304 may be performed to indicate, to the base station 102, the SSB type received by the UE 104 based on the PRACH preamble comprised by the PRACH transmitted to the base station 102.

In this optional or additional aspect, in block 1306, the performing in block 1004 may further include transmitting, to the base station 102, a PRACH comprising the selected PRACH preamble. For example, in an aspect, the UE 104, the RIS component 198, and/or the transmitting component 914 may be configured to or may comprise means for transmitting, to the base station 102, a PRACH comprising the selected PRACH preamble.

For example, the transmitting in block 1306 may include transmitting, to the base station 102 via the RIS 410, a PRACH that comprises the selected PRACH preamble.

Further, for example, the transmitting in block 1306 may be performed to indicate, to the base station 102, the SSB type received by the UE 104 based on the PRACH preamble comprised by the PRACH transmitted to the base station 102.

Figure 14:
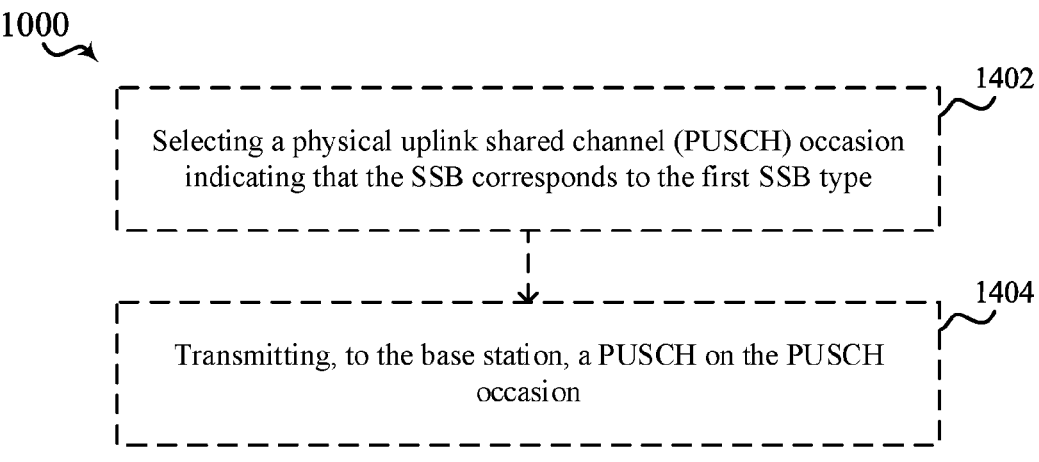
FIG. 14 is a flowchart of fourth additional or optional steps for a method of wireless communication to be performed by a UE in accordance with various aspects of the present disclosure.

Referring to FIG. 14 in another optional or additional aspect, in block 1402, the method 1000 may further include selecting a PUSCH occasion indicating that the SSB corresponds to the first SSB type. For example, in an aspect, the UE 104, the RIS component 198, and/or the selecting component 918 may be configured to or may comprise means for selecting the PUSCH occasion indicating that the SSB corresponds to the first SSB type.

For example, the selecting in block 1402 may include selecting a PUSCH occasion that indicates that the received SSB corresponds to the type 1 SSB. Each PUSCH occasion may consist of multiple demodulation reference signal (DMRS) ports and DMRS sequences.

Further, for example, the selecting in block 1402 may be performed to determine a PUSCH occasion that the UE 104 may use to indicate to the base station 102 that the UE 104 has received a type 1 SSB.

In this optional or additional aspect, in block 1404, the method 1000 may further include transmitting, to the base station, a PUSCH on the PUSCH occasion. For example, in an aspect, the UE 104, the RIS component 198, and/or the transmitting component 914 may be configured to or may comprise means for transmitting, to the base station, a PUSCH on the PUSCH occasion.

For example, the transmitting in block 1404 may include transmitting the PUSCH to the base station 102, via the RIS 410, using the resources corresponding to the selected PUSCH occasion.

Further, for example, the transmitting in block 1404 may be performed to indicate, to the base station 102, the SSB type received by the UE 104 based on the PUSCH occasion used to transmit the PUSCH to the base station 102 during the RACH procedure. Thus, aspects presented herein may allow base station 102 to determine that UE 104 received a type 1 SSB and that RIS-assisted channel training procedures may be needed.

Figure 15:
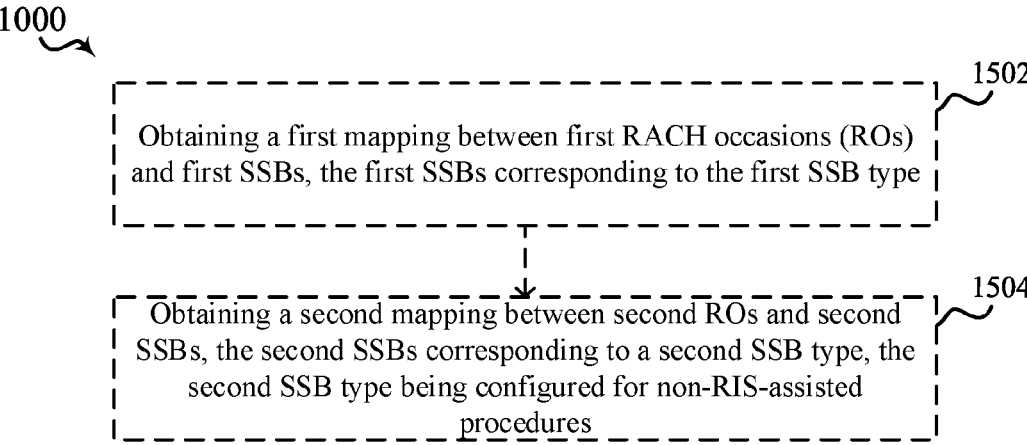
FIG. 15 is a flowchart of fifth additional or optional steps for a method of wireless communication to be performed by a UE in accordance with various aspects of the present disclosure.

Referring to FIG. 15 in another optional or additional aspect, in block 1502, the method 1000 may further include obtaining a first mapping between first ROs and first SSBs, the first SSBs corresponding to the first SSB type. For example, in an aspect, the UE 104, the RIS component 198, and/or the obtaining component 916 may be configured to or may comprise means for obtaining a first mapping between the first ROs and the first SSBs, the first SSBs corresponding to the first SSB type.

For example, the obtaining in block 1502 may include obtaining a first mapping between first ROs and the first SSBs. The first mapping identifying one or more ROs associated with type 1 SSBs.

Further, for example, the obtaining in block 1502 may be performed to obtain first ROs that the UE 104 may utilize to transmit a PRACH to the base station 102. The base station 102 may determine, based on the RO utilized to transmit the PRACH, that UE 104 received a type 1 SSB and that RIS-assisted channel training procedures may be needed.

In this optional or additional aspect, in block 1504, the method 1000 may further include obtaining a second mapping between second ROs and second SSBs, the second SSBs corresponding to a second SSB type, the second SSB type being configured for non-RIS-assisted procedures. For example, in an aspect, the UE 104, the RIS component 198, and/or the obtaining component 916 may be configured to or may comprise means for obtaining a second mapping between second ROs and second SSBs, the second SSBs corresponding to a second SSB type, the second SSB type being configured for non-RIS-assisted procedures.

For example, the obtaining in block 1504 may include obtaining a second mapping between second ROs and second SSBs. The second mapping identifying one or more ROs associated with type 0 SSBs. Type 0 SSBs (or "legacy" SSBs) may be designated for conventional (or "legacy") channel training procedures. That is, conventional channel training procedures may not include the RIS 410 to establish a communication channel between the base station 102 and the UE 104, for example.

In some optional or additional aspects, the obtaining component 916 may be further configured to obtain a third mapping between ROs and type 1 SSBs and type 0 SSBs. For example, one portion of the third mapping may identify one or more ROs associated with type 1 SSBs. Another portion of the third mapping may further identify one or more ROs associated with type 0 SSBs.

In other optional or additional aspects, the mappings between ROs and SSBs may further include spatial filtering configurations suitable for transmissions or reflections via the RIS 410.

Further, for example, the obtaining in block 1504 may be performed to obtain first ROs that the UE 104 may utilize to transmit a PRACH to the base station 102. The base station 102 may determine, based on the RO utilized to transmit the PRACH, that UE 104 received a type 0 SSB and that non-RIS-assisted (e.g., "conventional") channel training procedures may be needed.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

In one example scenario, according to various aspects of the present disclosure, a base station 102 may transmit one or more type 1 SSBs via a RIS 410. The one or more type 1 SSBs may be transmitted by the base station 102 in a synchronization burst according to a synchronization raster.

The type 1 SSB may be configured for RIS-assisted channel training procedures. The base station 102 may further perform, with the UE 104 according to the SSB, a RACH procedure. The base station 102 may receive, as part of the RACH procedure, an indication that the UE 104 received a type 1 SSB.

In some optional or additional aspects, the base station 102 may transmit the one or more type 1 SSBs at multiple SSB resources using a same transmit spatial filter of the base station. In such aspects, the UE 104 may receive at least one type 1 SSB reflected by the RIS 410 on a receive spatial filter of the UE 104. In other aspects, performing the RACH procedure may comprise receiving, by the base station 102 from the UE 410, a PRACH having been transmitted on a transmit spatial filter of the UE 104. In response to receiving the PRACH on a receive spatial filter of the base station 102, the base station 102 may indicate a suitable spatial filter for reflecting the type 1 SSB at the RIS 410.

In other optional or additional aspects, the base station 102 may obtain a mapping between ROs and SSB types. For example, a first portion of the mapping may correspond to the type 1 SSBs and a second portion of the mapping may correspond to the type 0 SSBs. Additionally or alternatively, the mapping may comprise a first mapping between first ROs and type 1 SSBs and a second mapping between second ROs and type 0 SSBs. In some aspects, the mapping may further comprise spatial filtering configurations suitable for transmissions or reflections at the RIS 410. In other aspects, the base station 102 may provide the mapping to the UE 104.

In other optional or additional aspects, performing the RACH procedure may comprise receiving, by the base station 102 from the UE 104, a PRACH using a particular RO. The base station 102 may determine, based at least in part on the particular RO and the mapping between the ROs and the SSB types, that the UE 104 received a type 1 SSB.

In some optional or additional aspects, the base station 102 may obtain a set of PRACH preambles. In such aspects, performing the RACH procedure may comprise receiving, by the base station 102 from the UE 104, a PRACH comprising a particular PRACH preamble. The base station 102 may determine, based at least in part on the particular PRACH preamble and the set of PRACH preambles, that the UE 104 received a type 1 SSB.

In other optional or additional aspects, performing the RACH procedure may comprise receiving, by the base station 102 from the UE 104 via the RIS 410, a PUSCH indicating that the UE 104 received a type 1 SSB and that RIS-assisted channel training procedures are needed. The base station 102 may determine, according to the indication in the PUSCH whether the UE 104 received a type 1 SSB. For example, the PUSCH may comprise a demodulation reference signal that indicates that the received SSB corresponds to the type 1 SSB. Additionally or alternatively, a scrambling code of the PUSCH may indicate that the received SSB corresponds to the type 1 SSB. In other optional or additional aspects, a payload of the PUSCH may comprise an indication that the received SSB corresponds to the type 1 SSB. Additionally or alternatively, a PUSCH occasion used to transmit the PUSCH may indicate that the received SSB corresponds to the type 1 SSB. Each PUSCH occasion may consist of multiple demodulation reference signal (DMRS) ports and DMRS sequences.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication to be performed by a user equipment (UE), comprising:

receiving, from a base station, a synchronization signal block (SSB) via a reconfigurable intelligent surface (RIS), the SSB corresponding to a first SSB type configured for RIS-assisted procedures or corresponding to a second SSB type configured for non-RIS-assisted procedures;

determining, based on the SSB, whether the RIS-assisted procedures are needed; and transmitting, to the base station according to the SSB, an indication whether the SSB corresponds to the first SSB type as part of a random access channel (RACH) procedure, wherein the first SSB type indicates that the RIS-assisted procedures are needed.

2. The method of claim 1, wherein:

receiving the SSB corresponding to the first SSB type configured for the RIS-assisted procedures comprises receiving the SSB reflected by the RIS on a receive spatial filter of the UE, the SSB having been transmitted at multiple SSB resources using a same transmit spatial filter of the base station; and wherein the method further comprises transmitting, to the base station, a physical random access channel (PRACH) on a transmit spatial filter of the UE, wherein the transmit spatial filter of the UE corresponds to the receive spatial filter of the UE that received the SSB.

3. The method of claim 1, further comprising:

obtaining a mapping between RACH occasions (ROs) and SSB types;

selecting a RO according to the SSB and the mapping, the RO indicating that the SSB corresponds to the first SSB type; and transmitting, to the base station, a physical random access channel (PRACH) using the RO.

4. The method of claim 1, further comprising:

obtaining a set of physical random access channel (PRACH) preambles;

selecting a PRACH preamble from the set of PRACH preambles, the selected PRACH preamble indicating that the SSB corresponds to the first SSB type; and transmitting, to the base station, a PRACH comprising the selected PRACH preamble.

5. The method of claim 1, further comprising:

transmitting, to the base station, a physical uplink shared channel (PUSCH) carrying the indication that the SSB corresponds to the first SSB type, wherein:

a demodulation reference signal of the PUSCH indicates that the SSB corresponds to the first SSB type; or a scrambling code of the PUSCH indicates that the SSB corresponds to the first SSB type; or a payload of the PUSCH comprises the indication that the SSB corresponds to the first SSB type.

6. The method of claim 1, further comprising:

selecting a physical uplink shared channel (PUSCH) occasion indicating that the SSB corresponds to the first SSB type; and transmitting, to the base station, a PUSCH on the PUSCH occasion.

7. The method of claim 1, further comprising:

obtaining a first mapping between first RACH occasions (ROs) and first SSBs, the first SSBs corresponding to the first SSB type; and obtaining a second mapping between second ROs and second SSBs, the second SSBs corresponding to the second SSB type.

8. The method of claim 1, further comprising:

obtaining a mapping between RACH occasions (ROs) and SSBs, a first portion of the SSBs corresponding to the first SSB type and a second portion of the SSBs corresponding to the second SSB type.

9. The method of claim 1, further comprising:

obtaining a mapping between RACH occasions (ROs) and first SSBs, the first SSBs corresponding to the first SSB type, the mapping indicating spatial filtering configurations suitable for transmissions or reflections at the RIS.

10. The method of claim 1, wherein a received second SSB type is prioritized over a received first SSB type in determining whether the RIS-assisted procedures are needed.

11. An apparatus for wireless communication to be performed by a user equipment (UE), comprising:

memory; and a processor communicatively coupled with the memory and configured to:

receive, from a base station, a synchronization signal block (SSB) via a reconfigurable intelligent surface (RIS), the SSB corresponding to a first SSB type configured for RIS-assisted procedures or corresponding to a second SSB type configured for non-RIS-assisted procedures;

determine, based on the SSB, whether the RIS-assisted procedures are needed; and transmit, to the base station, an indication whether the SSB corresponds to the first SSB type as part of a random access channel (RACH) procedure, wherein the first SSB type indicates that the RIS-assisted procedures are needed.

12. The apparatus of claim 11, wherein:

to receive the SSB corresponding to the first SSB type configured for the RIS-assisted procedures comprises to receive the SSB reflected by the RIS on a receive spatial filter of the UE, the SSB having been transmitted at multiple SSB resources using a same transmit spatial filter of the base station; and wherein the processor is further configured to transmit, to the base station, a physical random access channel (PRACH) on a transmit spatial filter of the UE, wherein the transmit spatial filter of the UE corresponds to the receive spatial filter of the UE that received the SSB.

13. The apparatus of claim 11, wherein the processor is further configured to:

obtain a mapping between RACH occasions (ROs) and SSB types;

select a RO according to the SSB and the mapping, the RO indicating that the SSB corresponds to the first SSB type; and transmit, to the base station, a physical random access channel (PRACH) using the RO.

14. The apparatus of claim 11, wherein the processor is further configured to:

obtain a set of physical random access channel (PRACH) preambles;

select a PRACH preamble from the set of PRACH preambles, the selected PRACH preamble indicating that the SSB corresponds to the first SSB type; and transmit, to the base station, a PRACH comprising the selected PRACH preamble.

15. The apparatus of claim 11, wherein the processor is further configured to:

transmit, to the base station, a physical uplink shared channel (PUSCH) carrying the indication that the SSB corresponds to the first SSB type, wherein:

a demodulation reference signal of the PUSCH indicates that the SSB corresponds to the first SSB type; or a scrambling code of the PUSCH indicates that the SSB corresponds to the first SSB type; or a payload of the PUSCH comprises the indication that the SSB corresponds to the first SSB type.

16. The apparatus of claim 11, wherein the processor is further configured to:

select a physical uplink shared channel (PUSCH) occasion indicating that the SSB corresponds to the first SSB type; and transmit, to the base station, a PUSCH on the PUSCH occasion.

17. The apparatus of claim 11, wherein the processor is further configured to:

obtain a first mapping between first RACH occasions (ROs) and first SSBs, the first SSBs corresponding to the first SSB type; and obtain a second mapping between second ROs and second SSBs, the second SSBs corresponding to the second SSB type.

18. The apparatus of claim 11, wherein the processor is further configured to:

obtain a mapping between RACH occasions (ROs) and SSBs, a first portion of the SSBs corresponding to the first SSB type and a second portion of the SSBs corresponding to the second SSB type.

19. The apparatus of claim 11, wherein the processor is further configured to:

obtain a mapping between RACH occasions (ROs) and first SSBs, the first SSBs corresponding to the first SSB type, the mapping indicating spatial filtering configurations suitable for transmissions or reflections at the RIS.

20. An apparatus for wireless communication to be performed by a user equipment (UE), comprising:

means for receiving, from a base station, a synchronization signal block (SSB) via a reconfigurable intelligent surface (RIS), the SSB corresponding to a first SSB type configured for RIS-assisted procedures or corresponding to a second SSB type configured for non-RIS-assisted procedures;

means for determining, based on the SSB, whether the RIS-assisted procedures are needed; and means for transmitting, to the base station according to the SSB, an indication whether the SSB corresponds to the first SSB type as part of a random access channel (RACH) procedure, wherein the first SSB type indicates that the RIS-assisted procedures are needed.

21. The apparatus of claim 20, wherein:

the means for receiving the SSB corresponding to the first SSB type configured for the RIS-assisted procedures comprise further means for receiving the SSB reflected by the RIS on a receive spatial filter of the UE, the SSB having been transmitted at multiple SSB resources using a same transmit spatial filter of the base station; and the apparatus further comprises means for transmitting, to the base station, a physical random access channel (PRACH) on a transmit spatial filter of the UE, wherein the transmit spatial filter of the UE corresponds to the receive spatial filter of the UE that received the SSB.

22. The apparatus of claim 20, further comprising:

means for obtaining a mapping between RACH occasions (ROs) and SSB types;

means for selecting a RO according to the SSB and the mapping, the RO indicating that the SSB corresponds to the first SSB type; and means for transmitting, to the base station, a physical random access channel (PRACH) using the RO.

23. The apparatus of claim 20, further comprising:

means for obtaining a set of physical random access channel (PRACH) preambles;

means for selecting a PRACH preamble from the set of PRACH preambles, the selected PRACH preamble indicating that the SSB corresponds to the first SSB type; and means for transmitting, to the base station, a PRACH comprising the selected PRACH preamble.

24. The apparatus of claim 20, further comprising:

means for transmitting, to the base station, a physical uplink shared channel (PUSCH) carrying the indication that the SSB corresponds to the first SSB type, wherein:

a demodulation reference signal of the PUSCH indicates that the SSB corresponds to the first SSB type; or a scrambling code of the PUSCH indicates that the SSB corresponds to the first SSB type; or a payload of the PUSCH comprises the indication that the SSB corresponds to the first SSB type.

25. The apparatus of claim 20, further comprising:

means for selecting a physical uplink shared channel (PUSCH) occasion indicating that the SSB corresponds to the first SSB type; and means for transmitting, to the base station, a PUSCH on the PUSCH occasion.

26. The apparatus of claim 20, further comprising:

means for obtaining a first mapping between first RACH occasions (ROs) and first SSBs, the first SSBs corresponding to the first SSB type; and means for obtaining a second mapping between second ROs and second SSBs, the second SSBs corresponding to the second SSB type.

27. The apparatus of claim 20, further comprising:

means for obtaining a mapping between RACH occasions (ROs) and SSBs, a first portion of the SSBs corresponding to the first SSB type and a second portion of the SSBs corresponding to the second SSB type.

28. The apparatus of claim 20, further comprising:

means for obtaining a mapping between RACH occasions (ROs) and first SSBs, the first SSBs corresponding to the first SSB type, the mapping indicating spatial filtering configurations suitable for transmissions or reflections at the RIS.

* * * * *